US012424043B2

(12) United States Patent
Akutsu et al.

(10) Patent No.: US 12,424,043 B2
(45) Date of Patent: *Sep. 23, 2025

(54) STAY MANAGEMENT APPARATUS, STAY MANAGEMENT METHOD, NON-TRANSITORY COMPUTER-READABLE MEDIUM STORING PROGRAM, AND STAY MANAGEMENT SYSTEM

(71) Applicant: NEC Corporation, Tokyo (JP)

(72) Inventors: Tatsuki Akutsu, Tokyo (JP); Akira Kamei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,627

(22) Filed: Jun. 12, 2024

(65) Prior Publication Data

US 2024/0331474 A1    Oct. 3, 2024

Related U.S. Application Data

(63) Continuation of application No. 17/907,820, filed as application No. PCT/JP2020/009139 on Mar. 4, 2020, now Pat. No. 12,039,818.

(51) Int. Cl.
*G07C 9/25* (2020.01)
*G07C 9/27* (2020.01)

(52) U.S. Cl.
CPC .............. *G07C 9/257* (2020.01); *G07C 9/27* (2020.01); *G07C 2209/02* (2013.01); *G07C 2209/08* (2013.01)

(58) Field of Classification Search
CPC ...... G07C 9/257; G07C 9/27; G07C 2209/02; G07C 2209/08; G07C 9/37;
(Continued)

(56) References Cited

U.S. PATENT DOCUMENTS

2002/0191817 A1    12/2002   Sato et al.
2006/0126906 A1    6/2006    Sato et al.
(Continued)

FOREIGN PATENT DOCUMENTS

JP    2002-279466 A    9/2002
JP    2006-099486 A    4/2006
(Continued)

OTHER PUBLICATIONS

International Search Report for PCT Application No. PCT/JP2020/009139, mailed on Jul. 21, 2020.
(Continued)

*Primary Examiner* — Vernal U Brown

(57) ABSTRACT

A stay management apparatus includes a registration unit for acquiring a face image of a visitor and to register the face image, an entry control unit for authenticating the visitor based on authentication target information that is associated with identification information of the visitor and to permit entry of the visitor, an acquisition unit for acquiring destination information, about inside the building, which is associated with the identification information of the visitor, a determination unit for determining a permitted stay duration of the visitor inside the building based on the destination information, a detection unit for detecting stay of the visitor by face authentication, based on monitor images that are sequentially captured, and an output unit for outputting an alert when stay of the visitor is detected by the face authentication after a lapse of the permitted stay duration.

10 Claims, 19 Drawing Sheets

(58) Field of Classification Search
CPC ........... G06K 9/00261; G06K 9/00369; H04N 7/183; G05B 15/02; G16H 20/13
See application file for complete search history.

(56) References Cited

U.S. PATENT DOCUMENTS

| | | | |
|---|---|---|---|
| 2014/0086450 A1 | 3/2014 | Huang | G06V 40/167 382/103 |
| 2019/0116338 A1 | 4/2019 | Ma | H04N 7/15 |
| 2019/0141294 A1 | 5/2019 | Thörn | H04N 7/183 |
| 2019/0147251 A1 | 5/2019 | Numata | |
| 2019/0380662 A1 | 12/2019 | Kwan | G16H 20/13 |
| 2020/0064790 A1 | 2/2020 | Galvez | G06Q 50/163 |
| 2021/0407230 A1* | 12/2021 | Amuduri | H04W 12/63 |

FOREIGN PATENT DOCUMENTS

| | | |
|---|---|---|
| JP | 2006-293913 A | 10/2006 |
| JP | 2014-232357 A | 12/2014 |
| JP | 2019-091395 A | 6/2019 |
| JP | 2019-186697 A | 10/2019 |
| WO | 2018/220710 A1 | 12/2018 |

OTHER PUBLICATIONS

JP Office Action for JP Application No. 2024-020227, mailed on Dec. 10, 2024 with English Translation.

\* cited by examiner

STAY MANAGEMENT APPARATUS, STAY MANAGEMENT METHOD, NON-TRANSITORY COMPUTER-READABLE MEDIUM STORING PROGRAM, AND STAY MANAGEMENT SYSTEM

This application is a Continuation of U.S. application Ser. No. 17/907,820 filed on Aug. 29, 2022, which is a National Stage Entry of PCT/JP2020/009139 filed on Mar. 4, 2020, the contents of all of which are incorporated herein by reference, in their entirety.

TECHNICAL FIELD

The present disclosure relates to a stay management apparatus, a stay management method, a non-transitory computer-readable medium storing a program, and a stay management system.

BACKGROUND ART

Patent Literature 1 discloses an entry/exit management system for controlling entry/exit by face authentication.

CITATION LIST

Patent Literature

Japanese Unexamined Patent Application Publication No. 2006-293913

SUMMARY OF INVENTION

Technical Problem

During business, companies and the like need to admit temporary entry of visitors such as outside business operators. However, in such cases, if the visitor enters an unnecessary place at a visit destination, or stays for an unnecessarily long period of time, there may be security problems.

An object of the present disclosure, which has been made to solve such problems, is to provide a stay management apparatus and the like for appropriately managing stay of a visitor.

Solution to Problem

A stay management apparatus according to a first aspect of the present disclosure includes:
  a registration unit for acquiring a face image of a visitor, and for registering the face image in an authentication apparatus;
  an entry control unit for authenticating the visitor based on authentication target information that is associated with identification information of the visitor, and for permitting entry of the visitor into a building;
  an acquisition unit for acquiring visit destination information, about inside the building, which is associated with the identification information of the visitor;
  a determination unit for determining a permitted stay duration of the visitor inside the building based on the visit destination information that is acquired;
  a detection unit for detecting stay of the visitor by face authentication using the authentication apparatus, based on a monitor image that is captured by at least one surveillance camera inside the building; and
  an output unit for outputting an alert in a case where stay of the visitor is detected by the face authentication after a lapse of the permitted stay duration from permission of the entry.

A stay management method according to a second aspect of the present disclosure includes:
  acquiring a face image of a visitor, and registering the face image in an authentication apparatus;
  authenticating the visitor based on authentication target information that is associated with identification information of the visitor, and permitting entry of the visitor into a building;
  acquiring visit destination information, about inside the building, which is associated with the identification information of the visitor;
  determining a permitted stay duration of the visitor inside the building based on the visit destination information that is acquired;
  detecting stay of the visitor by face authentication using the authentication apparatus, based on a monitor image that is captured by at least one surveillance camera inside the building; and
  outputting an alert in a case where stay of the visitor is detected by the face authentication after a lapse of the permitted stay duration from permission of the entry.

A non-transitory computer-readable medium, storing a program, according to a third aspect of the present disclosure causes a computer to perform:
  a process of acquiring a face image of a visitor, and of registering the face image in an authentication apparatus;
  a process of authenticating the visitor based on authentication target information that is associated with identification information of the visitor, and of permitting entry of the visitor into a building;
  a process of acquiring visit destination information, about inside the building, which is associated with the identification information of the visitor;
  a process of determining a permitted stay duration of the visitor inside the building based on the visit destination information that is acquired;
  a process of detecting stay of the visitor by face authentication using the authentication apparatus, based on a monitor image that is captured by at least one surveillance camera inside the building; and
  a process of outputting an alert in a case where stay of the visitor is detected by the face authentication after a lapse of the permitted stay duration from permission of the entry.

A stay management system according to a fourth aspect of the present disclosure includes:
  a gate apparatus configured to restrict entry/exit of a visitor;
  a camera disposed inside a building;
  the stay management apparatus described above;
  an authentication apparatus including storage means for storing face feature information of the plurality of persons, and authentication means for performing face authentication using a collection of the face feature information; and
  a management terminal configured to receive output of the alert.

Advantageous Effects of Invention

According to the present disclosure, there may be provided a stay management apparatus and the like for appropriately managing stay of a visitor.

EXAMPLE EMBODIMENT

First Example Embodiment

Hereinafter, specific example embodiments to which the present invention is applied will be described in detail with reference to the drawings. However, the present invention is not limited to the example embodiments below. Furthermore, for the sake of clarity, the following description and drawings are simplified as appropriate.

Figure 1:
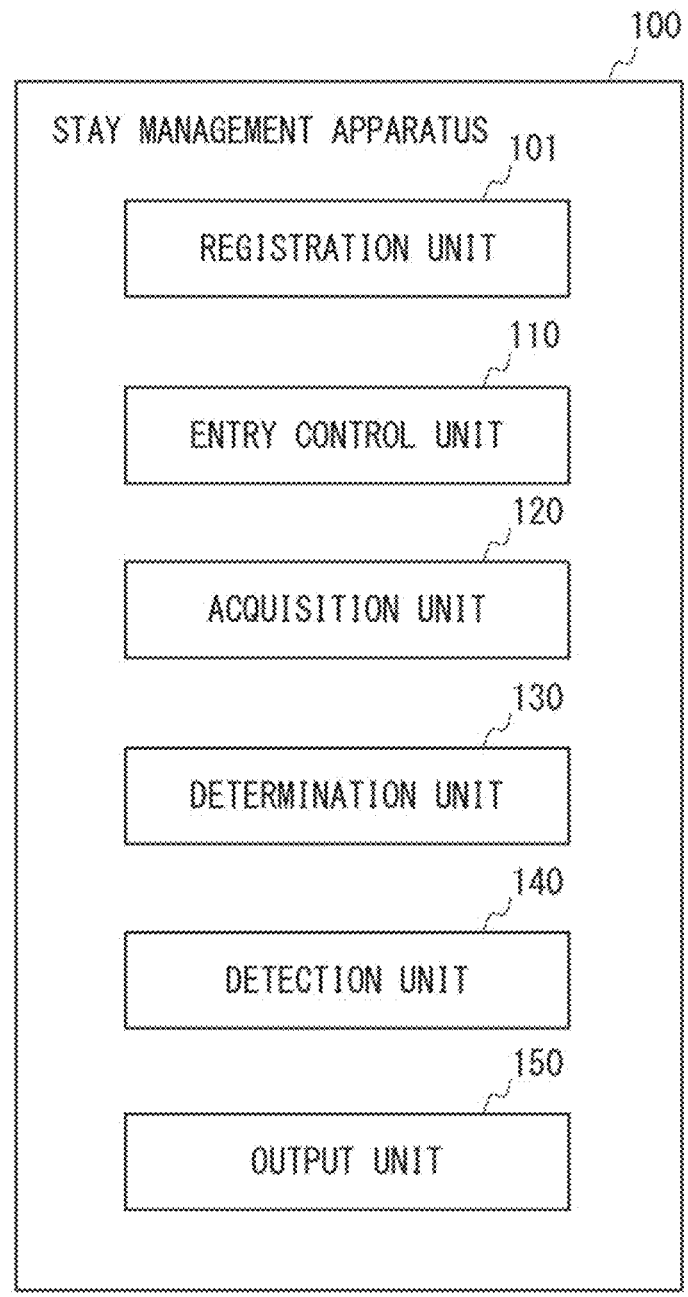
FIG. 1 is a block diagram showing a configuration of a stay management apparatus according to a first example embodiment.

FIG. 1 is a block diagram showing a configuration of a stay management apparatus according to a first example embodiment.

A stay management apparatus 100 is an information processing apparatus for permitting temporary entry of a visitor arriving at an entrance (a reception) of a building, and for managing stay of the visitor, and is a server apparatus implemented by a computer, for example. As shown in FIG. 1, the stay management apparatus 100 includes a registration unit 101, an entry control unit 110, an acquisition unit 120, a determination unit 130, a detection unit 140, and an output unit 150.

The registration unit 101 acquires a face image of a visitor, and registers the face image in an authentication apparatus. Furthermore, a visitor may transmit in advance, to the stay management apparatus 100, a face image that is scanned from an identification certificate with a photograph or a face image that is obtained by the visitor taking his/her face image using a mobile terminal (such as a smartphone), and the registration unit 101 may thus acquire the face image of the visitor. Furthermore, in the case where the face image of a visitor is not registered in advance, the registration unit 101 may acquire, via a network, the face image of the visitor that is captured at an entrance camera of a visit destination, and may store the face image in the authentication apparatus in advance.

The entry control unit 110 authenticates a visitor based on authentication target information that is associated with identification information of the visitor, and permits entry of the visitor into the building. The entry control unit 110 normally performs entry control on a gate apparatus that may be installed at a reception of the building, a personal computer (PC) operated by a receptionist, or the like. An authentication method of a visitor at the time of permitting entry may be authentication using identification information (such as a QR code (registered trademark)) that is issued to the visitor in advance, or may be face authentication based on a face image of the visitor that is registered in advance. The authentication target information may be the identification information (such as a QR code (registered trademark)) that is issued to the visitor in advance, or may be the face image of the visitor. The authentication target information may be other suitable target objects associated with an identification number of the visitor. Moreover, a pass (such as an electronic card) may be issued to a visitor who is permitted to enter.

The acquisition unit 120 acquires visit destination information, about inside the building, which is associated with the identification information of the visitor. The visit destination information about inside the building may be location information about inside the building, such as a level in the building, a conference room number in the building, or a seating position in a conference room, for example. Furthermore, the visit destination information about inside the building may be time information (such as conference time 9:00-11:00) associated with the location information (such as the conference room number).

The determination unit 130 determines a permitted stay duration of the visitor inside the building based on the visit destination information that is acquired. For example, the permitted stay duration may be determined based on a distance or a required time from the reception to the visit destination, or a stay duration (such as a conference duration) at the visit destination. That is, the permitted stay duration may be different depending on the visit destination information. In the case where the visit destination information includes distance information between a current position of the visitor and the visit destination, or a required time from the current position to the visit destination, the determination unit 130 may determine the permitted stay duration to be longer as the distance or the required time is increased. Specifically, the permitted stay duration is short for a visit destination that is close to the entrance, and the permitted stay duration is long for a visit destination that is far away. In the case where the visit destination information includes visit purpose information, the determination unit 130 may determine a different permitted stay duration depending on the purpose. A short permitted stay duration may be set when the visit purpose is merely delivery, and a long permitted stay duration may be set for a conference depending on agenda. Alternatively, the permitted stay duration may be uniformly determined to be a predetermined duration (such as two hours).

The detection unit 140 detects the stay of the visitor based on monitor images sequentially captured by one or more surveillance cameras in the building, by face authentication using the authentication apparatus in which the face image of the visitor is registered in advance in association with the identification information of the visitor.

In the case where the stay of the visitor is detected by face authentication after a lapse of the permitted stay duration from permission of entry, the output unit 150 outputs an alert. For example, the output unit 150 may output the alert to a management terminal for monitoring the inside of the building and for managing visitors.

Next, a flow of operation of the stay management apparatus according to the first example embodiment will be described with reference to FIG. 2.

Figure 2:
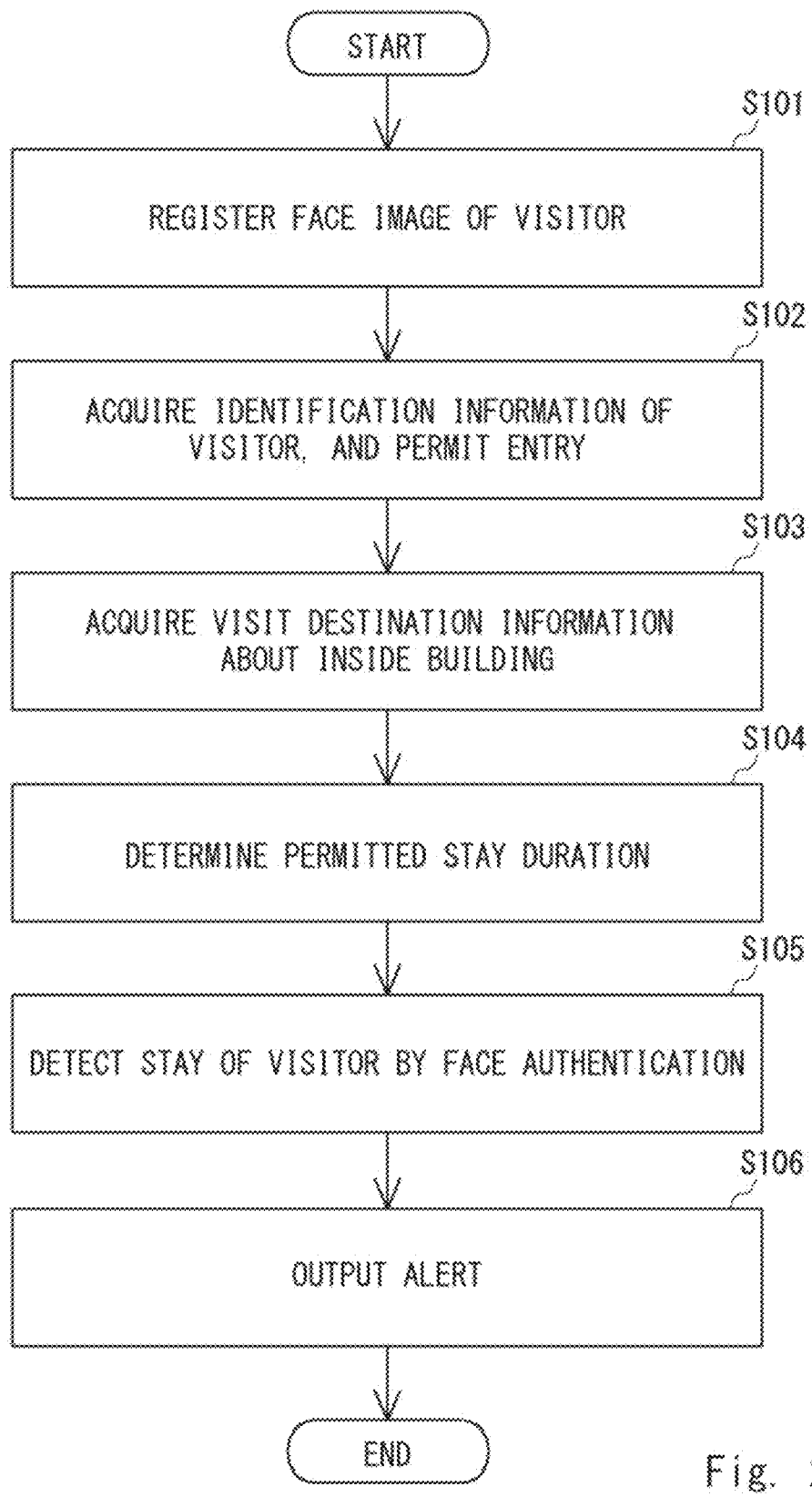
FIG. 2 is a flowchart showing an operation of the stay management apparatus according to the first example embodiment.

FIG. 2 is a flowchart showing an operation of the stay management apparatus.

First, the registration unit 101 registers the face image of a visitor in the authentication apparatus (step S101). The visitor may also transmit the face image of the visitor himself/herself to the registration unit 101 in advance using a computer. Alternatively, the face image of the visitor may be acquired by an entrance camera or the like at the reception of a company or the like, and be transmitted to the registration unit 101. The entry control unit 110 authenticates the visitor based on the authentication target information that is associated with the identification information of the visitor, and permits the visitor to enter the building (step S102). The acquisition unit 120 acquires the visit destination information, about inside the building, which is associated with the identification information of the visitor (step S103). The determination unit 130 determines the permitted stay duration (for example, two hours) for the visitor inside the building based on the visit destination information that is acquired (step S104). The detection unit 140 detects stay of the visitor by face authentication using the authentication apparatus (step S105). The detection unit 140 detects stay of the visitor by face authentication using the authentication apparatus, based on monitor images sequentially captured by one or more surveillance cameras inside the building. In the case where stay of the visitor is detected by face authentication after a lapse of the permitted stay duration from permission of entry, the output unit 150 outputs an alert (step S106). The alert may include the identification information of the visitor, or a location of image capturing (such as an installation location of the surveillance camera).

According to the present example embodiment described above, stay of a visitor may be appropriately managed, and a visitor who is staying longer than necessary may be detected and an alert may be output. Accordingly, a suspicious person among a plurality of visitors may be discovered, and security may be increased.

Second Example Embodiment

Figure 3:
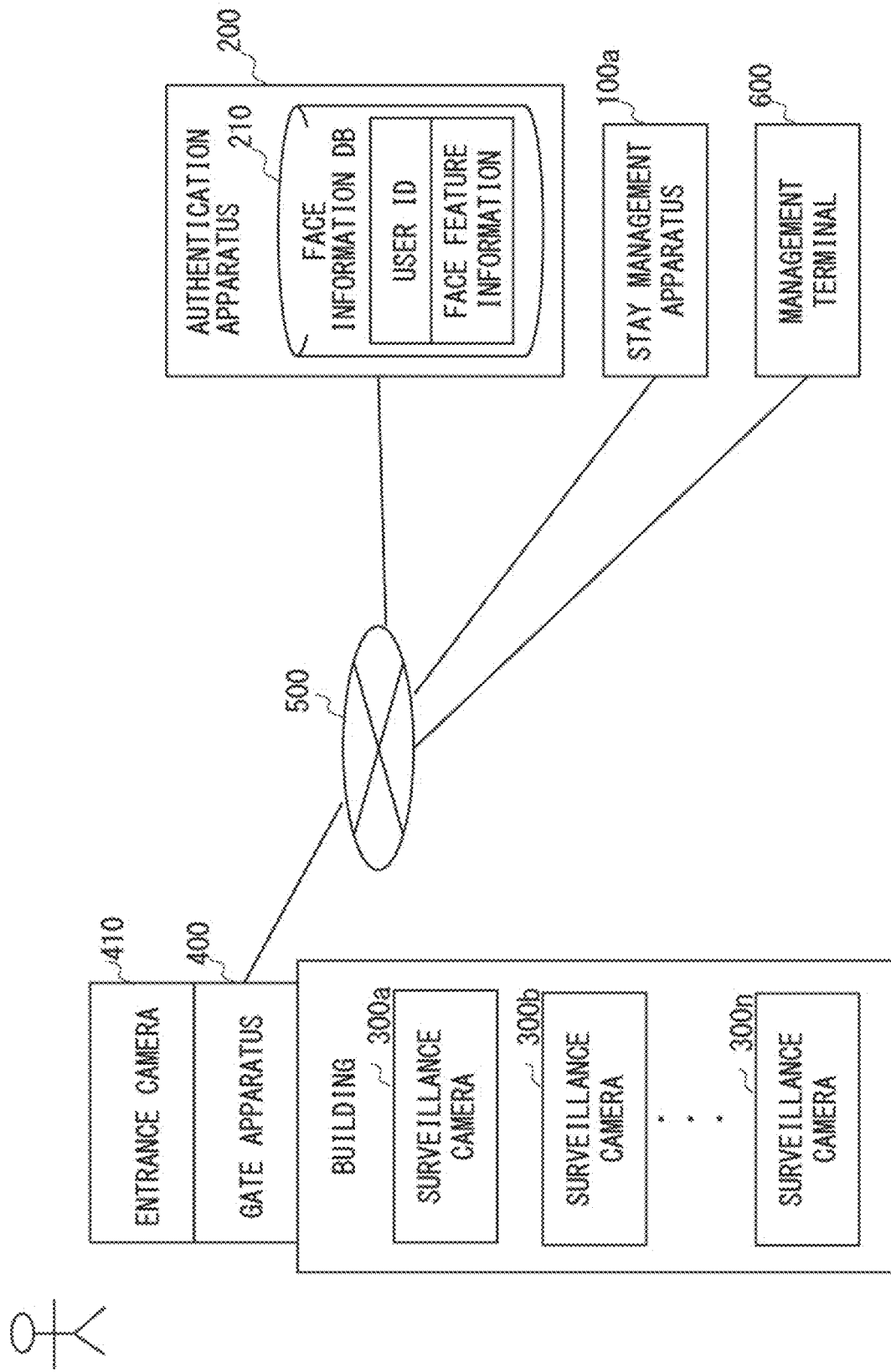
FIG. 3 is a block diagram showing a configuration of a stay management system according to a second example embodiment.

FIG. 3 is a block diagram showing a configuration of a stay management system according to a second example embodiment.

The stay management system may be used to manage a stay duration of a visitor from outside to ensure security inside a building of an organization such as a company. As shown in FIG. 3, the stay management system includes an entrance camera 410, a gate apparatus 400, a plurality of surveillance cameras 300 (300a, 300b, . . . , 300n) disposed inside the building, an authentication apparatus 200, a stay management apparatus 100a, and a management terminal 600. The entrance camera 410, the gate apparatus 400, the plurality of surveillance cameras 300 (300a, 300b, . . . , 300n), the authentication apparatus 200, the stay management apparatus 100a, and the management terminal 600 are interconnected by a wired or wireless network 500. Additionally, although shown as separate apparatuses in FIG. 3, the entrance camera 410 and the gate apparatus 400 may alternatively be an integrated apparatus.

Normally, the entrance camera 410 and the gate apparatus 400 may be disposed near the entrance or the reception of the building. The entrance camera 410 is controlled by the gate apparatus 400 to capture an image of a visitor arriving at the entrance of the building, and outputs a captured image to the gate apparatus 400. The entrance camera 410 may be a digital camera for capturing a still image or a moving image. Additionally, the entrance camera 410 may be remotely controlled by the stay management apparatus 100a, and in this case, the entrance camera 410 may output the captured image to the stay management apparatus 100a via the network 500.

Figure 4:
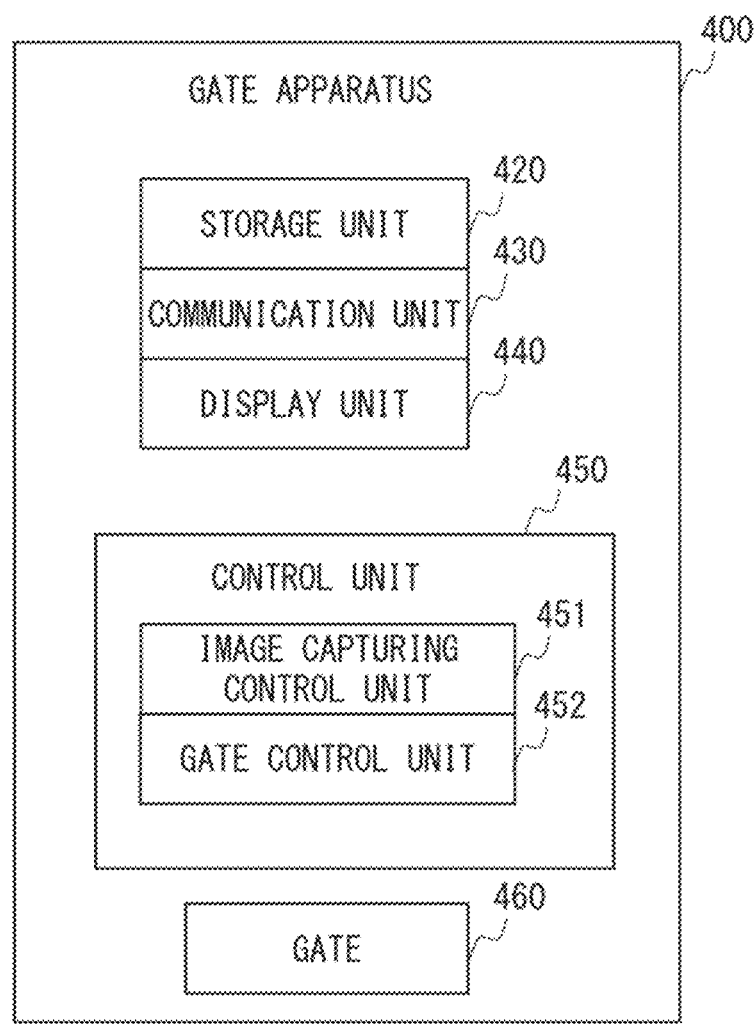
FIG. 4 is a block diagram showing a configuration of a gate apparatus according to the second example embodiment.

FIG. 4 is a block diagram showing a configuration of the gate apparatus according to the second example embodiment.

The gate apparatus 400 transmits a captured image from the entrance camera 410 to the stay management apparatus 100a via the network, and receives an authentication result from the stay management apparatus 100a via the network and displays the same. In the present example, the captured image from the entrance camera 410 is a face image of the visitor, but authentication may also be performed using identification information (such as a QR code (registered trademark)) of the visitor captured by the entrance camera 410.

As shown in FIG. 4, the gate apparatus 400 includes a storage unit 420, a communication unit 430, a display unit 440, a control unit 450, and a gate 460. The control unit 450 further includes an image capturing control unit 451, and a gate control unit 452. The gate 460 does not have to be embedded in the gate apparatus 400. That is, the gate apparatus 400 may be implemented by being connected to the external gate 460.

The storage unit 420 stores images of visitors captured by the entrance camera 410, and programs for implementing functions of the gate apparatus 400. For example, the storage unit 420 is a semiconductor memory, an optical disk, a hard disc (HD), or the like.

The communication unit 430 is a communication interface to the network 500. The communication unit 430 is used to communicate with other network node apparatuses forming the stay management system. The communication unit 430 may be used to perform wireless communication. For example, the communication unit 430 may be used to perform wireless LAN communication defined by IEEE 802.11 series, or mobile communication defined by 3rd generation partnership project (3GPP). Alternatively, the communication unit 430 may include a network interface card (NIC) compatible with IEEE 802.3 series, for example.

The display unit 440 is a liquid crystal display or a touch screen display, for example. In the case where the display unit 440 is a touch screen display, the display unit 440 also functions as a reception unit for receiving an operation input by the visitor.

The control unit 450 includes a processor (such as a CPU), a memory, and the like, and performs various processes of the gate apparatus by reading and executing software (computer programs) from the memory. The image capturing control unit 451 controls image capturing by the entrance camera 410. The gate control unit 452 controls opening/closing of the gate 460.

The gate apparatus 400 includes the gate 460 for restricting entry of a person into the building, and releases restriction at the gate in a case where an authentication result indicates successful face authentication. Furthermore, at the time of exit of the visitor, the gate apparatus 400 may release restriction at another gate (an exit gate), and may transmit, to the stay management apparatus, identification information (a visitor ID) of the exiting visitor captured by an exit camera (not shown). Alternatively, in the case where a pass (such as an electronic card) is handed to the visitor at the time of entry, the visitor may hold the pass over the gate apparatus, and exit of the visitor may thus be managed.

Figure 5:
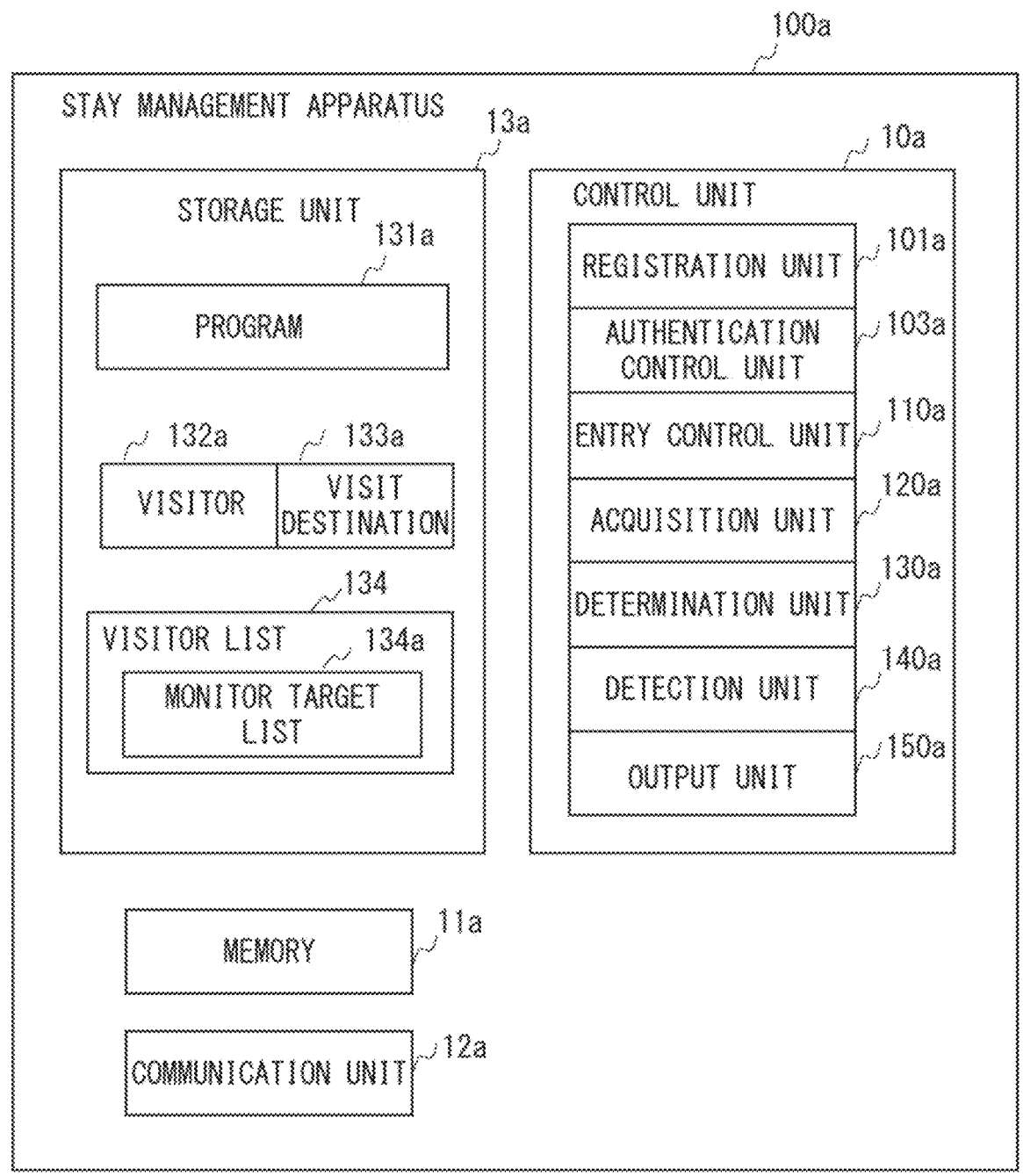
FIG. 5 is a block diagram showing a configuration of a stay management apparatus according to the second example embodiment.

FIG. 5 is a block diagram showing a configuration of the stay management apparatus according to the second example embodiment.

The stay management apparatus 100a is an information processing apparatus for permitting temporary entry of a visitor arriving at the entrance of the building, and for managing stay of the visitor. The stay management apparatus 100a is a server implemented by a computer, for example.

As shown in FIG. 5, the stay management apparatus 100a includes a control unit 10a, a memory 11a, a communication unit 12a, and a storage unit 13a.

The control unit 10a is a processor (a CPU) or the like, and performs various processes of the stay management apparatus by reading and executing software (computer programs) from the memory 11a. The control unit 10a includes a registration unit 101a, an authentication control unit 103a, an entry control unit 110a, an acquisition unit 120a, a determination unit 130a, a detection unit 140a, and an output unit 150a.

The registration unit 101a acquires a face photograph of a visitor, and registers the same in the authentication apparatus 200. For example, the registration unit 101a may acquire, via the network, a face image that is obtained by the entrance camera 410 capturing an image of the visitor himself/herself or an identification certificate with a photograph of the visitor, or may acquire, via the network, a face image of the visitor that is captured with a mobile terminal (such as a smartphone) possessed by the visitor. Moreover, in the case where visitor identification information and specification of the visit destination are received, the registration unit 101a may register the visitor identification information and the visit destination in a visit destination storage unit, in association with each other.

The authentication control unit 103a transmits an authentication request to the authentication apparatus based on a monitor image transmitted from the surveillance camera, or receives an authentication result from the authentication apparatus. Furthermore, the authentication control unit 103a manages a monitor target list indicating the visitor ID of at least one visitor as a monitor target, and removes the visitor ID that is no longer a monitor target (such as a person who left) from the list.

The entry control unit 110a performs face authentication of a visitor based on a captured image obtained by capturing an image of the visitor with the entrance camera and the face image that is registered in association with the identification information of the visitor, and permits entry of the visitor into the building. The entry control unit 110a performs entry control on the gate apparatus that may be disposed at the reception of the building. An authentication method of a visitor at the time of permitting entry may be through face authentication using a face image of the visitor that is registered in advance.

The acquisition unit 120a refers to the visit destination storage unit, and acquires the visit destination information, about inside the building, which is associated with the visitor for whom face authentication succeeded. For example, the visit destination information about inside the building may be location information about inside the building, such as a floor number in the building, a conference room number in the building, or a seating position in a conference room, for example. Furthermore, the visit destination information about inside the building may be time information (such as conference time 9:00-11:00) that is associated with the location information (such as the conference room number). The acquisition unit 120a refers to the visit destination storage unit, and acquires the visit destination information that is associated with the visitor for whom face authentication succeeded. Accordingly, thanks to advance registration of the face image of the visitor, the visit destination is automatically identified at the time of visit by face authentication, and entry is enabled by face authentication only, without requiring input of the visit destination.

The determination unit 130a determines the permitted stay duration of the visitor inside the building based on the visit destination information that is acquired. For example, the permitted stay duration may be determined based on a distance between the reception and the visit destination, or a stay duration (such as a conference duration) at the visit destination. That is, the permitted stay duration may be different for each visit destination information. Specifically, the permitted stay duration is short for a visit destination that is close to the entrance, and the permitted stay duration is long for a visit destination that is far away. Furthermore, in the case where the visit destination information includes the visit purpose information, the determination unit 130a may determine a different permitted stay duration depending on the purpose. A short permitted stay duration may be set when the visit purpose is merely delivery, and a long permitted stay duration may be set for a conference depending on agenda. Alternatively, the permitted stay duration may be uniformly determined for the visitors to be a predetermined duration (such as two hours).

The detection unit 140a detects stay of a visitor based on monitor images sequentially captured by one or more surveillance cameras inside the building, by face authentication using the authentication apparatus in which the face image of the visitor is registered in advance in association with the identification information of the visitor. Furthermore, the detection unit 140a may detect a monitor image based on a monitor target list taking, as targets, visitors who have not left and for whom the permitted stay duration is elapsed.

In the case where stay of the visitor is detected by face authentication after a lapse of the permitted stay duration from permission of entry, the output unit 150*a* outputs an alert. For example, the output unit 150*a* may output the alert to the management terminal 600 for monitoring the inside of the building and for managing visitors.

The communication unit 12*a* is a communication interface to the network 500. The communication unit 12*a* is used to communicate with other network node apparatuses forming the stay management system. The communication unit 430 may be used to perform wireless communication. For example, the communication unit 12*a* may be used to perform wireless LAN communication defined by IEEE 802.11 series, or mobile communication defined by 3rd generation partnership project (3GPP). Alternatively, the communication unit 12*a* may include a network interface card (NIC) compatible with IEEE 802.3 series, for example.

The storage unit 13*a* stores programs for implementing functions of the stay management apparatus 100*a*. For example, the storage unit 13*a* is an optical disk, a hard disc (HD), or the like. Furthermore, as a visit destination storage unit, the storage unit 13*a* may store a visitor 132*a* and a visit destination 133*a* in association with each other. The visitor 132*a* may include the visitor identification information (a name, an ID or the like) and a face image of the visitor. The visit destination 133*a* may include a location of the visit destination (such as the floor number, or the conference room number), visited person information, and the like. The storage unit 13*a* may further include a visitor list 134, and a monitor target list 134*a*. For example, the visitor list 134 may be a list of persons who visited on a specific day. The monitor target list is a list indicating visitors as monitor targets, among the visitor list.

Figure 6:
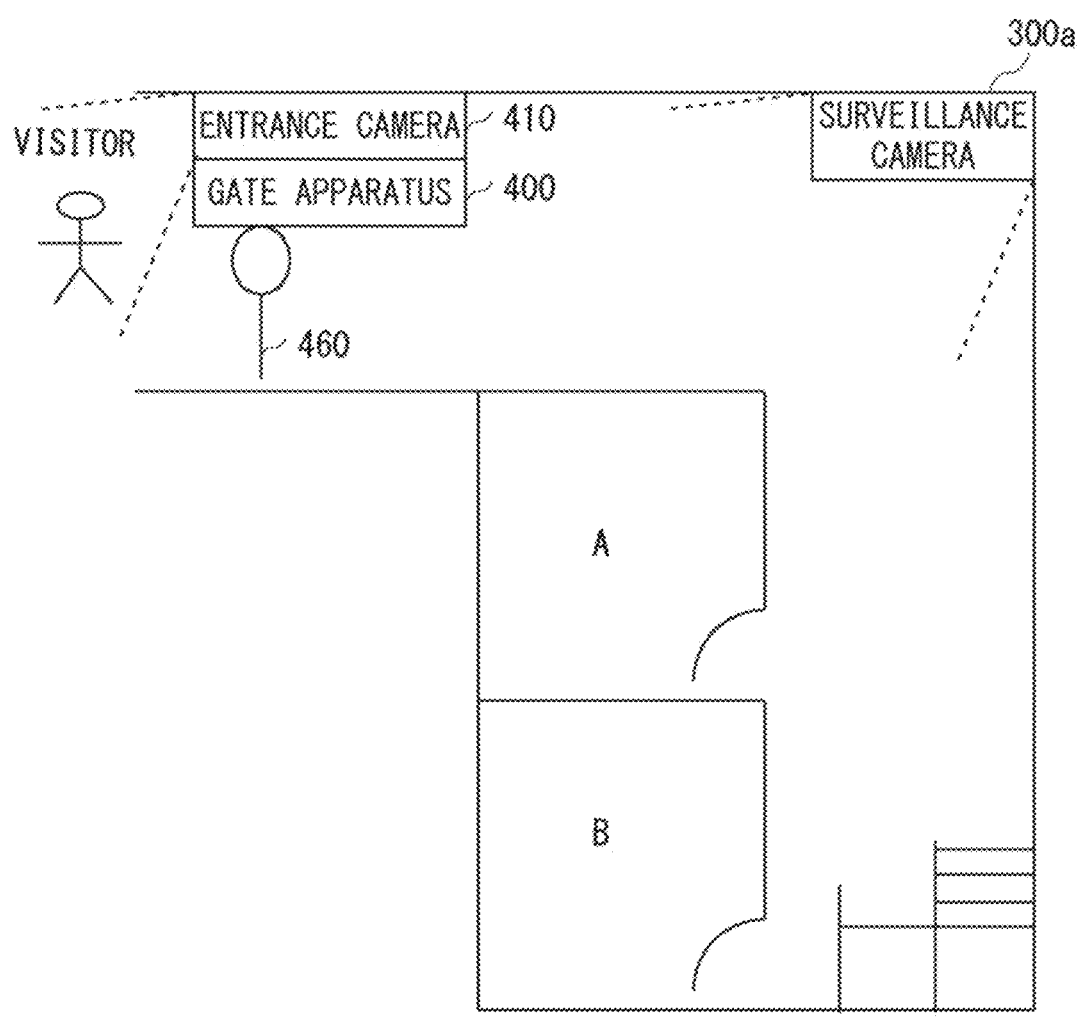
FIG. 6 is a diagram describing an example installation on a floor in a building according to the second example embodiment.

FIG. 6 is a diagram describing an example installation of the entrance camera, the gate apparatus, and the surveillance camera on a floor in the building. The gate 460 of the gate apparatus 400 restricts entry of a visitor arriving at the entrance of the building. The entrance camera 410 is disposed such that a visitor arriving at the entrance of the building is included in an angle of view. For its part, the surveillance camera 300*a* is disposed such that a visitor who entered is included in an angle of view.

The building does not have to be a one-story building, and may include two or more levels (floors). Furthermore, FIG. 6 shows two conference rooms, but the number of conference rooms is not limited thereto. It suffices if there is at least one surveillance camera on each floor.

Figure 7:
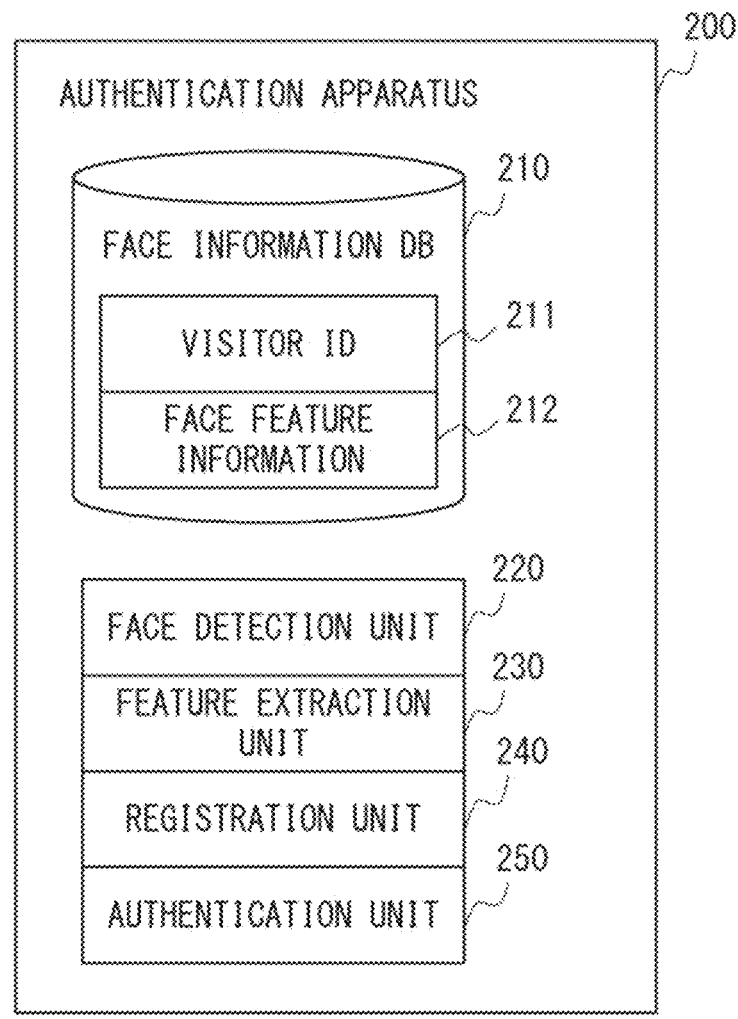
FIG. 7 is a block diagram showing a configuration of an authentication apparatus.

FIG. 7 is a block diagram showing a configuration of the authentication apparatus 200. The authentication apparatus 200 includes a face information DB 210, a face detection unit 220, a feature extraction unit 230, a registration unit 240, and an authentication unit 250.

The face information DB 210 stores the visitor ID and face feature information of the visitor in association with each other. The face information DB 210 is also referred to as a storage unit. In response to a face authentication request received from outside (for example, the stay management apparatus 100*a*), the authentication apparatus 200 checks a face image or face feature information included in the request against the face feature information of each visitor, and transmits a check result to a request source.

The face detection unit 220 detects a face region included in a registration image for registering face information, and outputs the same to the feature extraction unit 230. The feature extraction unit 230 extracts a feature from the face region detected by the face detection unit 220, and outputs the face feature information to the registration unit 240. The face feature information here is a collection of extracted features. Furthermore, the feature extraction unit 230 extracts a feature included in the face image received from the stay management apparatus 100*a*, and outputs the face feature information to the authentication unit 250.

At the time of registration of the face feature information, the registration unit 240 newly issues the visitor ID. The registration unit 240 registers, in the face information DB 210, the visitor ID that is issued and the face feature information extracted from the registration image in association with each other. The authentication unit 250 checks the face feature information that is extracted from the face image against the face feature information in the face information DB 210. The authentication unit 250 returns, to the stay management apparatus 100*a*, match/non-match of the face feature information. Match/non-match of the face feature information corresponds to success/failure of authentication.

Figure 8:
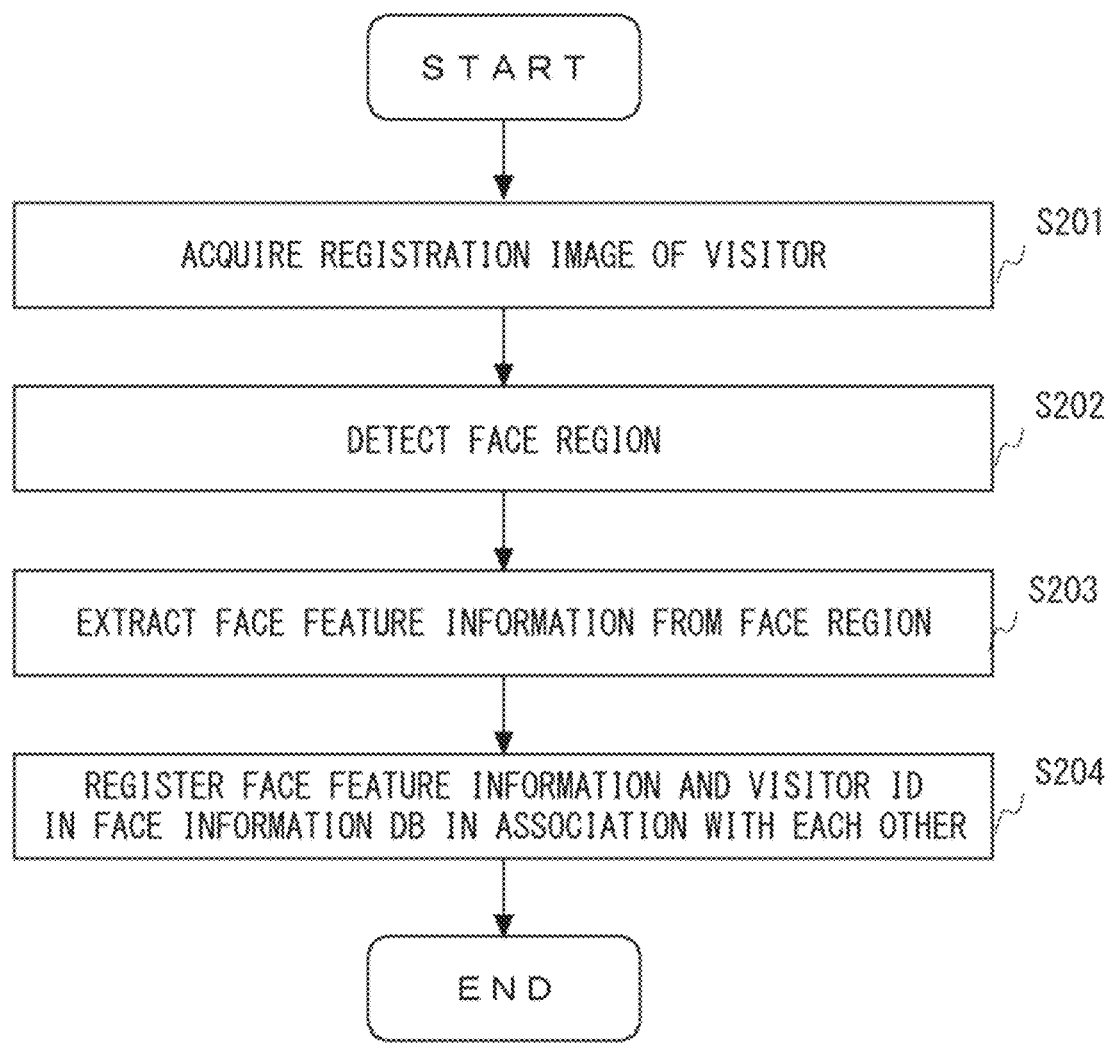
FIG. 8 is a flowchart showing a flow of a face information registration process by the authentication apparatus.

FIG. 8 is a flowchart showing a flow of a face information registration process by the authentication apparatus 200. First, the authentication apparatus 200 acquires the registration image included in a face information registration request (step S201). For example, the authentication apparatus 200 receives the face information registration request from a mobile terminal of the visitor or the stay management apparatus 100*a* via the network 500. Next, the face detection unit 220 detects the face region included in the registration image (step S202). Next, the feature extraction unit 230 extracts the feature from the face region detected in step S202, and outputs the face feature information to the registration unit 240 (step S203). Lastly, the registration unit 240 issues the visitor ID, and registers the visitor ID and the face feature information in the face information DB 210 in association with each other (step S204). Additionally, the authentication apparatus 200 may also receive the face feature information from a face authentication terminal or the like, and may register the same in the face information DB 210 in association with the visitor ID.

Figure 9:
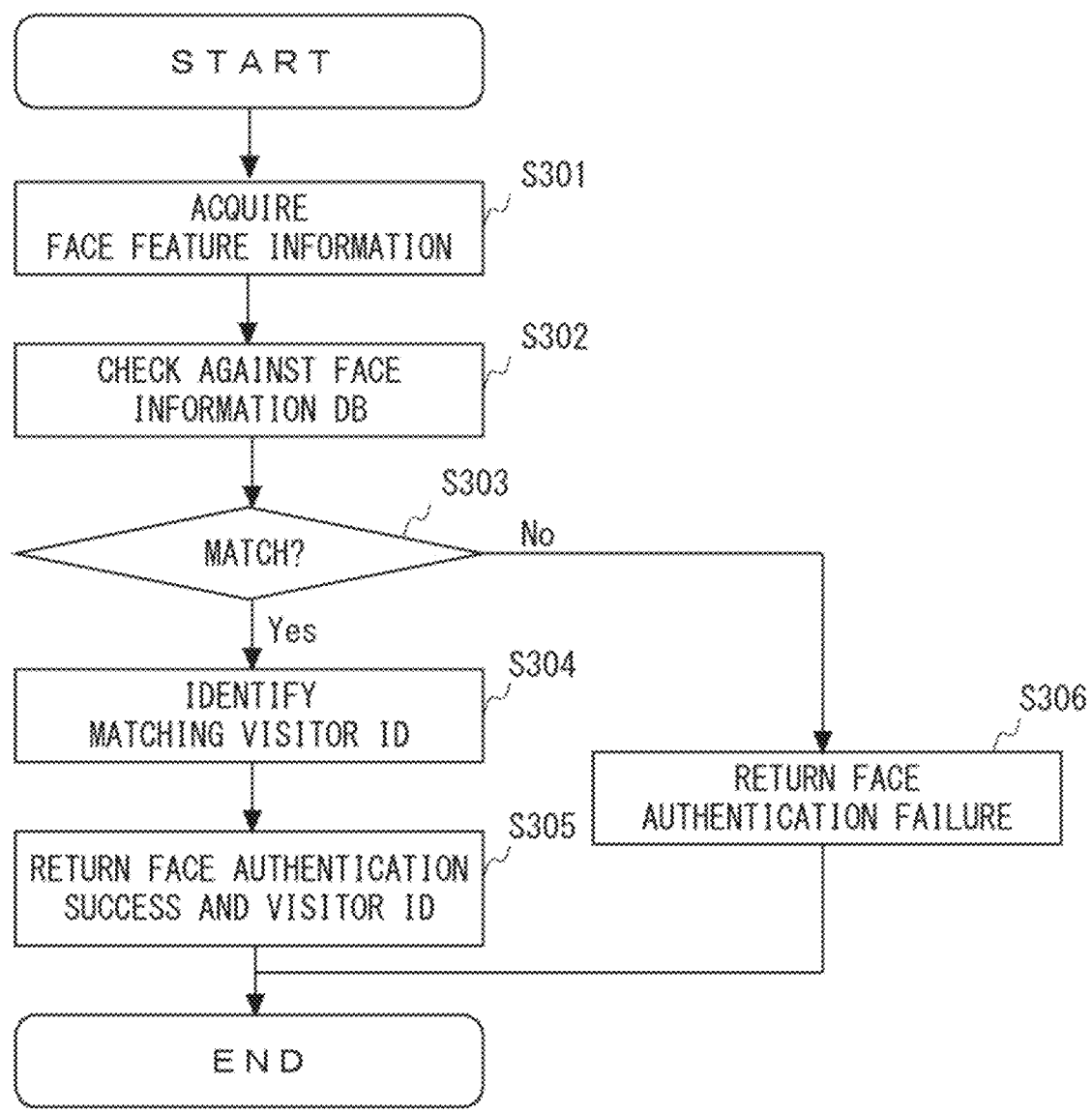
FIG. 9 is a flowchart showing a flow of a face authentication process by the authentication apparatus.

FIG. 9 is a flowchart showing a flow of a face authentication process by the authentication apparatus 200. First, the feature extraction unit 230 acquires the face feature information from the face image (the monitor image) received from the stay management apparatus 100*a* (step S301). For example, the authentication apparatus 200 receives the face image from the stay management apparatus 100*a*, and extracts the face feature information in the manner of steps S201 to S203. Alternatively, the authentication apparatus 200 may receive the face feature information from the stay management apparatus 100*a*. Next, the authentication unit 250 checks the face feature information that is acquired against the face information DB 210 (step S302). Additionally, from the standpoint of increasing checking accuracy, the face feature information that is acquired may be checked against the registration images that are associated with the visitor IDs in the visitor list or the visitor IDs in the monitor target list, instead of against all pieces of image data in the face information DB 210. In the case where the face feature information is matched (Yes in step S303), the authentication unit 250 identifies the visitor ID of a user with the matched face feature information (step S304), and returns, to the stay management apparatus 100*a*, a notice indicating face authentication success and the visitor ID that is identified (step S305). In the case where there is no matching face feature information (No in step S303), the authentication unit 250 returns, to the stay management apparatus 100*a*, a notice indicating face authentication failure (step S306).

Figure 10:
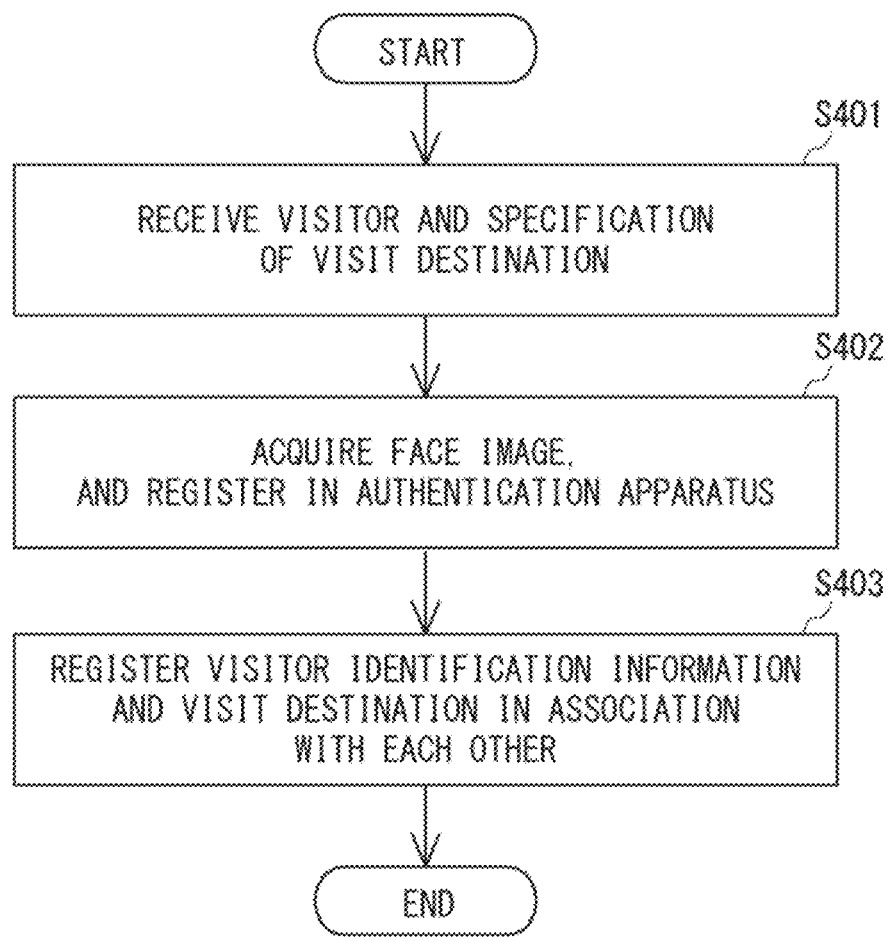
FIG. 10 is a flowchart describing a flow of reception of a visitor according to the second example embodiment.
Figure 11:
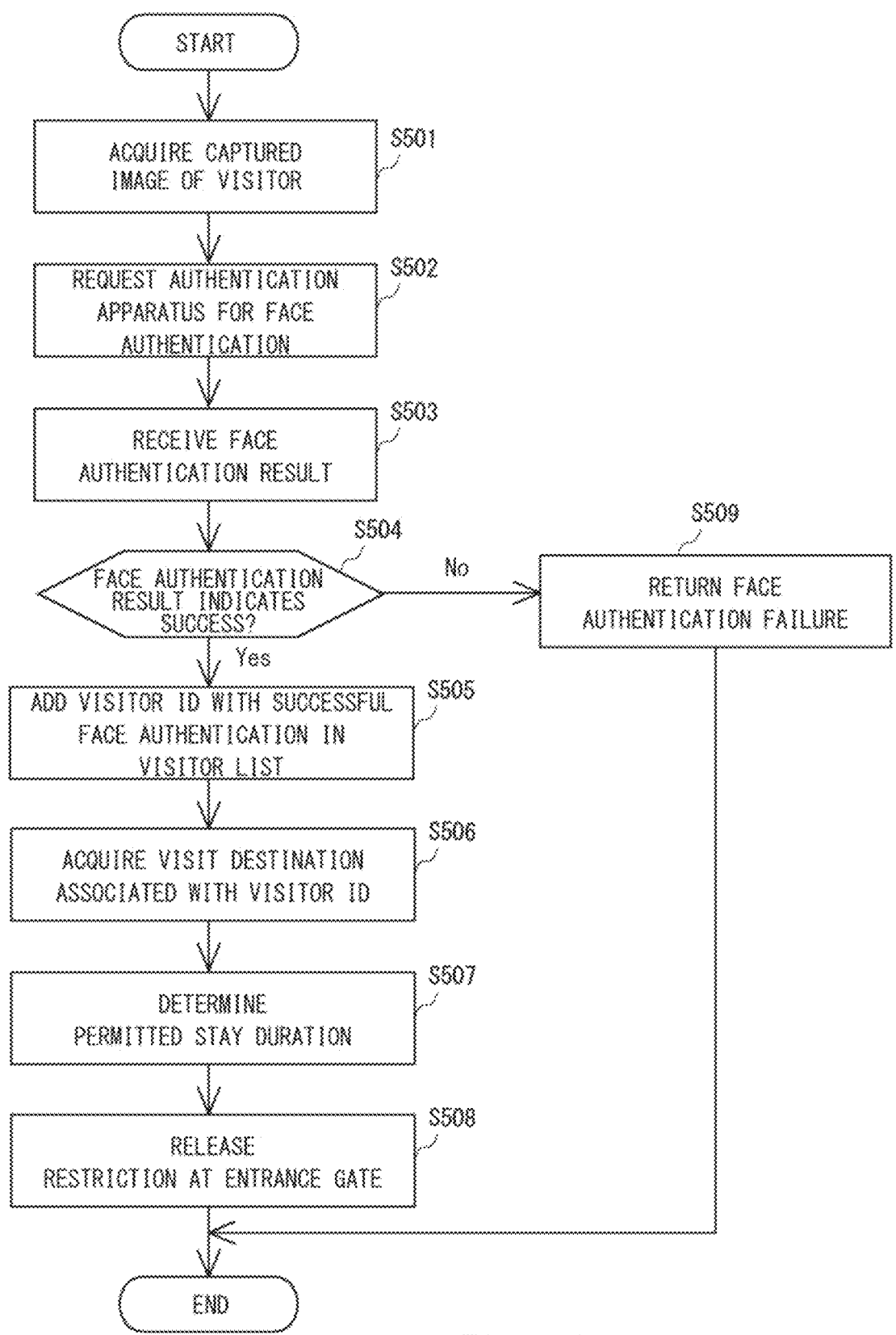
FIG. 11 is a flowchart describing a flow of passage of a visitor through an entrance gate by face authentication.
Figure 12:
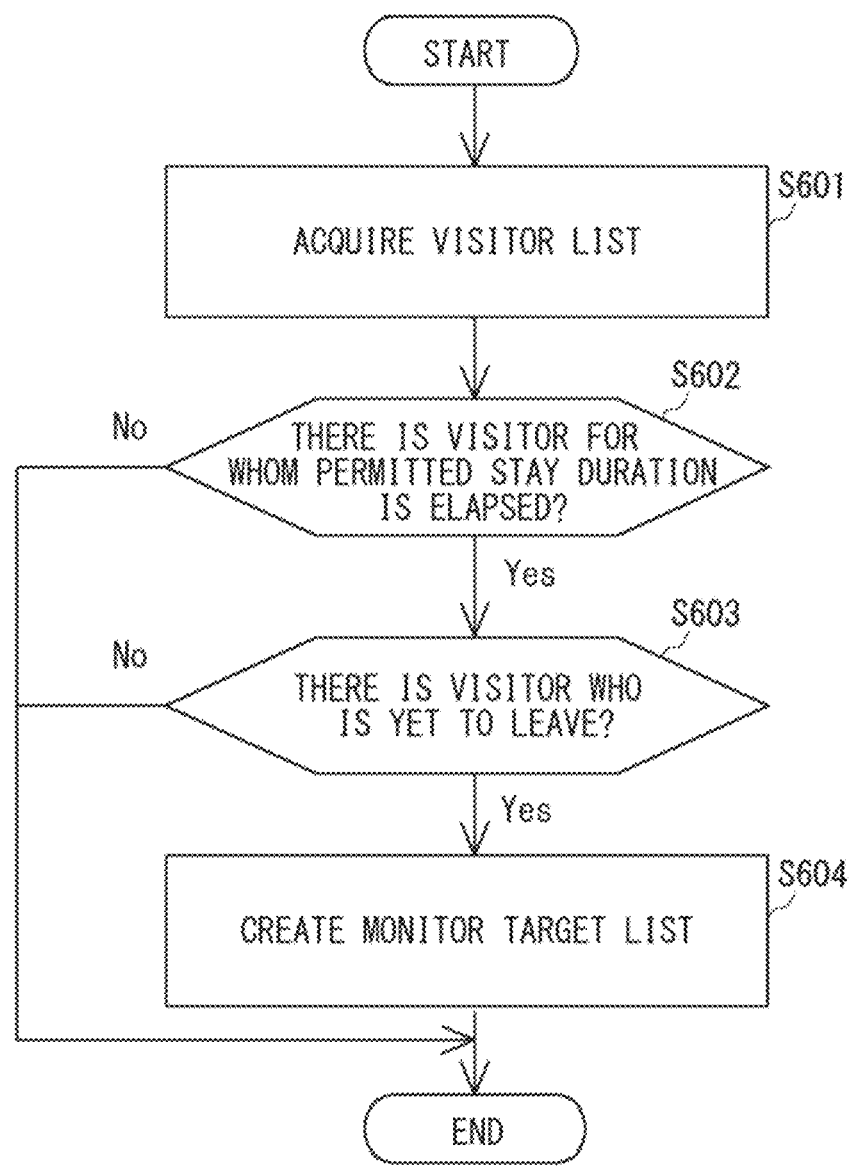
FIG. 12 is a flowchart describing a flow of creation of a monitor target list according to the second example embodiment.
Figure 13:
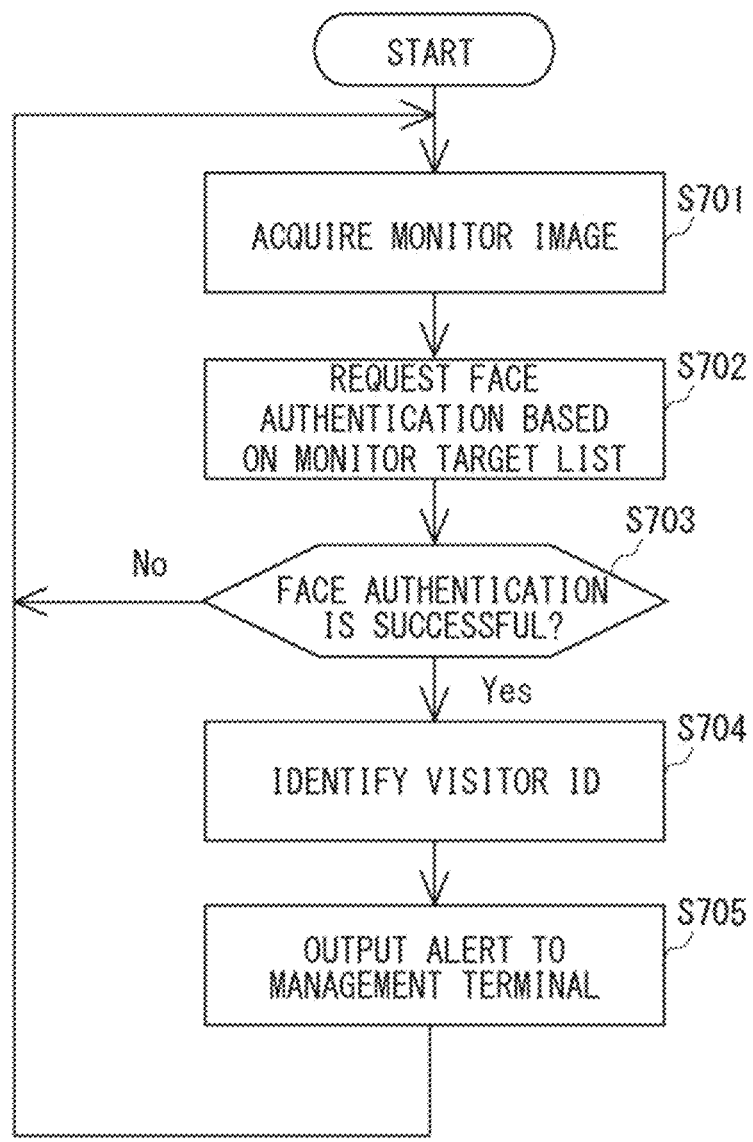
FIG. 13 is a flowchart describing a flow of stay management according to the second example embodiment.

Next, an overall operation of the stay management system according to the second example embodiment will be described with reference to FIGS. 10 to 13. FIG. 10 is a flowchart describing a flow of reception of a visitor. FIG. 11 is a flowchart describing a flow of passage of a visitor through the entrance gate by face authentication. FIG. 12 is a flowchart describing a flow of creation of the monitor target list. FIG. 13 is a flowchart describing a flow of stay management.

A flow of reception of a visitor will be described with reference to FIG. 10.

When a visitor arrives at the entrance of the building, the gate apparatus 400 receives the visitor and specification of the visit destination (step S401). This reception process is performed by the visitor inputting the visitor information and specification of the visit destination on a touch panel of the display unit 440 of the gate apparatus 400, for example. Alternatively, the reception process may be performed by an employee at the reception of the company as the visit destination operating a computer connected to the gate apparatus 400.

The stay management apparatus 100a acquires the face image, and registers the same in the authentication apparatus, in association with the identification information (such as the name or the visitor ID) of the visitor (step S402). The face image may be acquired from an identification certificate with a photograph, or may be acquired by capturing an image of the face of the visitor with a camera (such as the entrance camera). Furthermore, the identification information and the face image of the visitor may be acquired prior to the visit, via a terminal (such as a computer or a smartphone) of the visitor. Then, the registration unit 101a of the stay management apparatus 100a registers the face image of the visitor in the authentication apparatus 200, in association with the identification information (such as the name or the visitor ID) of the visitor.

The registration unit 101a of the stay management apparatus 100a registers the visitor and the visit destination in the storage unit 13a (the visit destination storage unit) of the stay management apparatus 100a, in association with each other (step S403).

Next, a flow of passage of a visitor through the entrance gate by face authentication will be described with reference to FIG. 11.

First, the entrance camera 410 captures a face image of the visitor, and transmits the same to the stay management apparatus 100a. The stay management apparatus 100a thus acquires a captured image including the face image of the visitor (step S501). The stay management apparatus 100a requests the authentication apparatus 200 for face authentication in relation to the captured image (step S502). The stay management apparatus 100a may request face authentication by specifying the visitor ID. The stay management apparatus 100a receives a face authentication result (step S503). In the case where the face authentication result indicates success (Yes in step S504), the visitor ID that is associated with successful face authentication is added in the visitor list 134 (step S505). The acquisition unit 120a acquires the visit destination that is associated with the visitor ID (step S506). The determination unit 130a determines the permitted stay duration (step S507). The entry control unit 110a releases restriction at the entrance gate (step S508). The visitor may then enter the building.

The visit destination is thus automatically identified by face authentication at the time of visit thanks to advance registration of the face image of the visitor, and input of the visit destination is not necessary and entry is enabled by just face authentication. Additionally, in the example shown in FIG. 11, the visit destination corresponding to the visitor ID and the permitted stay duration are determined using the entrance camera and the gate apparatus. However, the visit destination and the stay duration mentioned above may also be determined by a stay management apparatus that may be implemented by a computer and a camera at the reception or the like at the entrance of the building.

Next, a flow of creation of the monitor target list will be described with reference to FIG. 12.

The monitor target list takes, as targets, visitors who have not left and for whom the permitted stay durations are elapsed.

First, the stay management apparatus acquires the visitor list on a specific day (step S601), for example. Next, in the case where there is at least one visitor for whom the permitted stay duration is elapsed (Yes in step S602), whether the at least one visitor is yet to leave the building is further determined (step S603). For example, a pass (such as an electronic card) is issued to a visitor who is permitted to enter, and exit may be detected when the visitor holds the electronic card over an exit gate apparatus at the time of exit. In the case where there is at least one visitor who is yet to leave, the monitor target list is created (step S604).

A creation process for the monitor target list is repeatedly performed at predetermined intervals (such as every few minutes or every few seconds), and update to a latest monitor target list is thus performed. By narrowing down the visitor list to the monitor target list in this manner, accuracy of face authentication may be increased, and a processing time for face authentication may be reduced.

Next, a flow of stay management for a visitor after entry will be described with reference to FIG. 13.

The plurality of surveillance cameras 300a to 300n disposed inside the building capture an image of the visitor, and transmit the captured image to the stay management apparatus 100a via the network. The stay management apparatus 100a thus acquires the monitor image via the network, from at least one of the plurality of surveillance cameras (step S701). Next, in relation to the monitor image, the stay management apparatus 100a specifies the monitor target list, and requests the authentication apparatus for face authentication (step S702). In the case where a face authentication result that is received indicates success (Yes in step S703), the stay management apparatus 100a identifies the visitor ID associated with successful face authentication (step S704). The output unit 150a of the stay management apparatus 100a outputs an alert to the management terminal 600 (step S705). The alert may include the visitor ID that is identified, and location information of the surveillance camera that captured the image, among the plurality of surveillance cameras.

The stay management system according to the second example embodiment described above may appropriately manage stay of a visitor, detect a visitor who is staying longer than necessary, and output an alert. Accordingly, a suspicious person among a plurality of visitors may be discovered, and security may be increased. Furthermore, by narrowing down the visitor list to the monitor target list, accuracy of face authentication may be increased, and a processing time of face authentication may be reduced.

Third Example Embodiment

Figure 14:
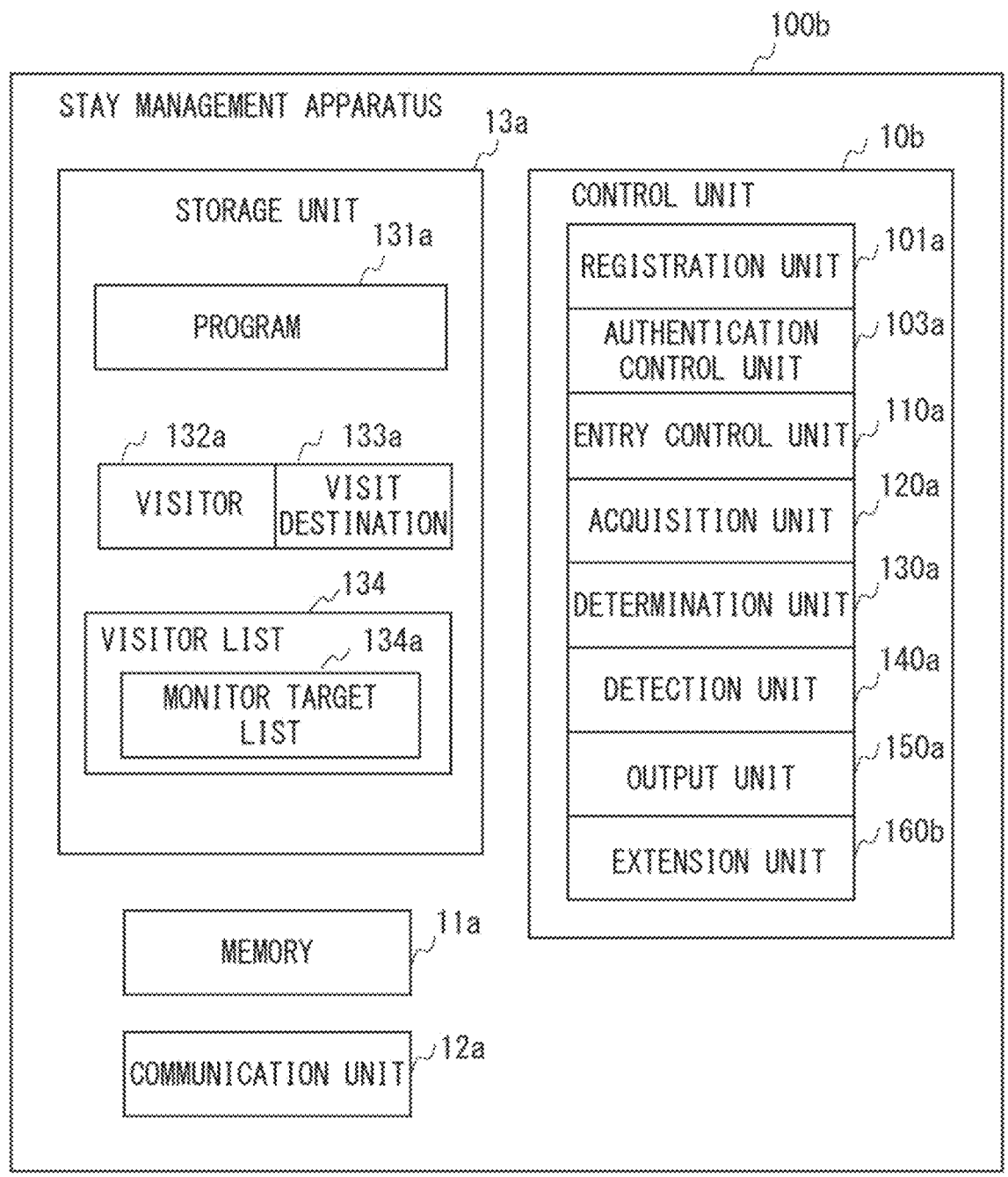
FIG. 14 is a block diagram showing a configuration of a stay management apparatus according to a third example embodiment.

FIG. 14 is a block diagram showing a configuration of a stay management apparatus according to a third example embodiment. In FIG. 14, structural elements same as those in the second example embodiment will be denoted by same reference signs as in FIG. 5, and description thereof will be omitted as appropriate.

The stay management apparatus according to the present example embodiment additionally includes an extension unit 160*b* in a control unit 10*b*. The extension unit 160*b* extends the permitted stay duration of a visitor in the case where the image of the visitor captured by a specific surveillance camera (such as a camera on a second or higher floor) is confirmed by face authentication.

Figure 15:
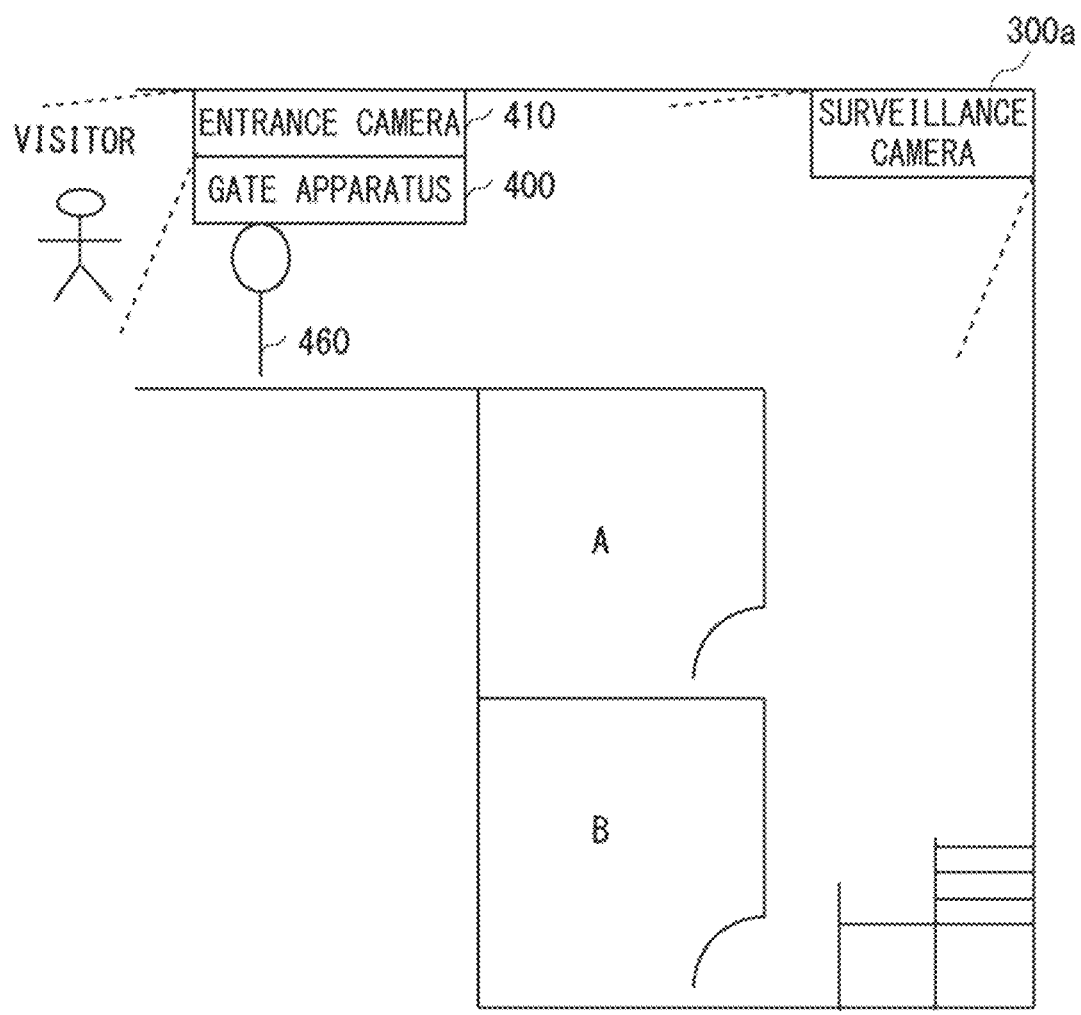
FIG. 15 is a diagram describing an example installation on a first floor according to the third example embodiment.
Figure 16:
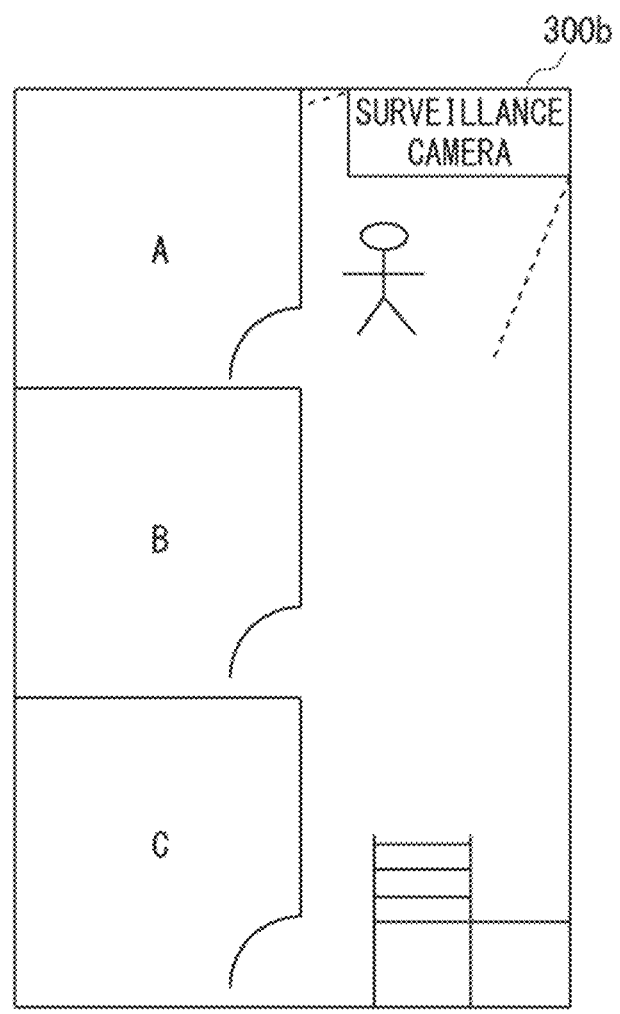
FIG. 16 is a diagram describing an example installation on a second floor according to the third example embodiment.
Figure 17:
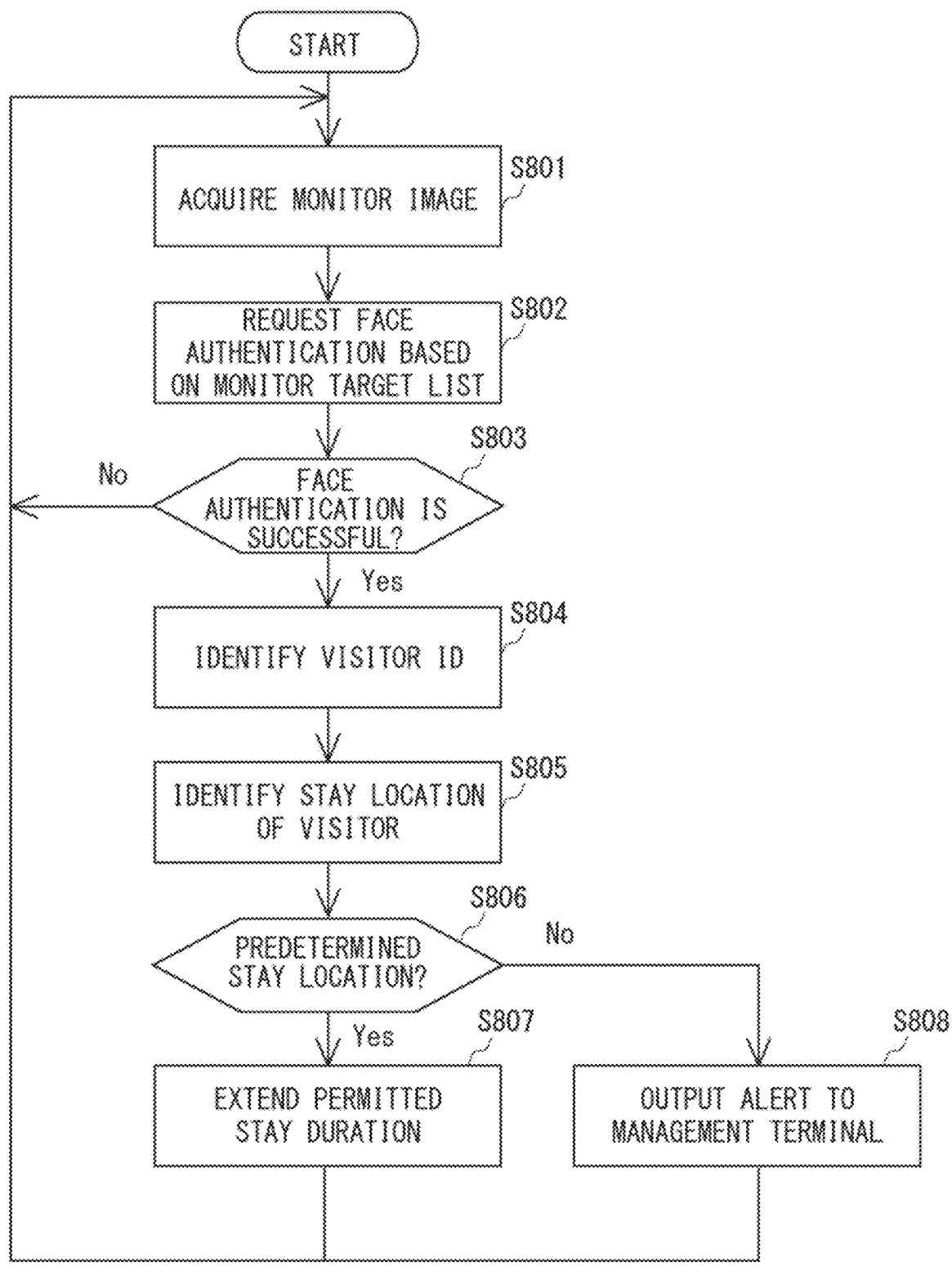
FIG. 17 is a flowchart describing a flow of stay management according to the third example embodiment.

FIG. 15 is a diagram describing an example installation on a first floor according to the third example embodiment. FIG. 16 is a diagram describing an example installation on a second floor according to the third example embodiment. FIG. 17 is a flowchart describing a flow of stay management by the stay management system according to the third example embodiment.

As described in the second example embodiment, at the time of a visitor passing through the gate, the acquisition unit 120*a* of the stay management apparatus acquires the visit destination information (such as conference room B on the second floor). Furthermore, the determination unit 130*a* of the stay management apparatus determines the permitted stay duration (for example, one hour) of the visitor in the building. Then, when the visitor moves from the first floor to the second floor, the surveillance camera 300*b* captures an image of the visitor. When movement of the visitor to the second floor is confirmed by face authentication, the extension unit 160*b* may extend the permitted stay duration for the visitor.

A flow of stay management according to the third example embodiment will be described with reference to FIG. 17.

At least one of the plurality of surveillance cameras 300*a* to 300*n* disposed inside the building captures an image of the visitor, and transmit the captured image to the stay management apparatus 100*a* via the network. The stay management apparatus 100*a* thus acquires the monitor image via the network, from at least one of the plurality of surveillance cameras (step S801). Next, in relation to the monitor image, the stay management apparatus 100*a* specifies the monitor target list, and requests the authentication apparatus for face authentication (step S802). In the case where a face authentication result that is received indicates success (Yes in step S803), the stay management apparatus 100*a* identifies the visitor ID associated with successful face authentication (step S804). A stay location of the visitor is identified from the location of the surveillance camera that captured the image (step S805). Whether a current position of the visitor is a predetermined stay location or not is determined (step S806). In the case where the visitor is at the predetermined stay location (Yes in step S806), the extension unit 160*b* extends the permitted stay duration for the visitor (step S807). In the case where the visitor is not at the predetermined stay location (No in step S806), the output unit 150*a* outputs an alert including location information of the visitor, to the management terminal 600 (step S808).

In this manner, with the stay management system according to the third example embodiment, the permitted stay duration of a visitor is extended as appropriate in the case where a building as the visit destination is very large, and stay management may be more appropriately performed.

Fourth Example Embodiment

Figure 18:
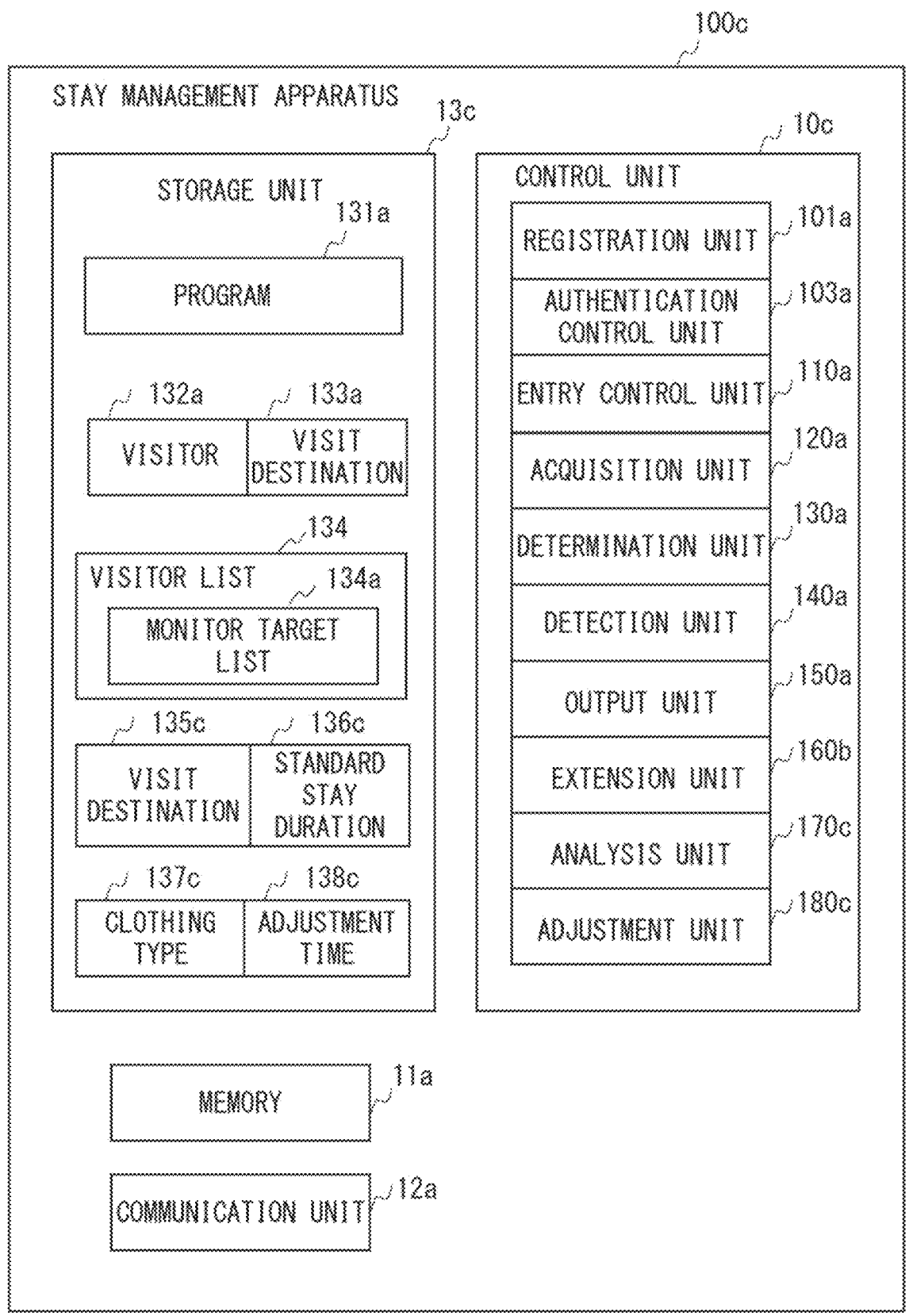
FIG. 18 is a block diagram showing a configuration of a stay management apparatus according to a fourth example embodiment.

FIG. 18 is a block diagram showing a configuration of a stay management apparatus according to a fourth example embodiment. In FIG. 18, structural elements same as those in the second example embodiment or the third example embodiment will be denoted by same reference signs as in FIG. 5 or FIG. 14, and description thereof will be omitted as appropriate.

The stay management apparatus according to the present example embodiment additionally includes, in a control unit 10*c*, an analysis unit 170*c* and an adjustment unit 180*c*. The analysis unit 170*c* and the adjustment unit 180*c* support a function of a determination unit 130*c* of determining the permitted stay duration based on the visit destination information of the visitor. That is, the analysis unit 170*c* acquires a captured image from the entrance camera 410 or the surveillance camera 300, and analyzes a clothing type of the visitor. The adjustment unit 180*c* determines an adjustment time for adjusting the permitted stay duration, based on the analyzed clothing type of the visitor.

Furthermore, the stay management apparatus according to the present example embodiment additionally includes, in a storage unit 13*c*, a standard stay duration 136*c* that is associated with a visit destination 135*c*, and an adjustment time 138*c* that is associated with a clothing type 137*c*. As the clothing type, a suit, work clothes of a cleaner or the like, a uniform of a delivery person, and the like may be cited as examples. The adjustment time may be freely set in the manner of two hours for a suit, one hour for work clothes of a cleaner or the like, and zero hours for a uniform of a delivery person, for example. That is, the adjustment time may be set differently depending on a purpose of visit that is associated with the clothing type. Accordingly, the permitted stay duration may be adjusted based on the clothing type analyzed from a captured image of the visitor. Additionally, in the case where the visit destination information includes distance information or a required time between the current position of the visitor and the visit destination, the standard stay duration may be set longer, the greater the distance or the required time.

Figure 19:
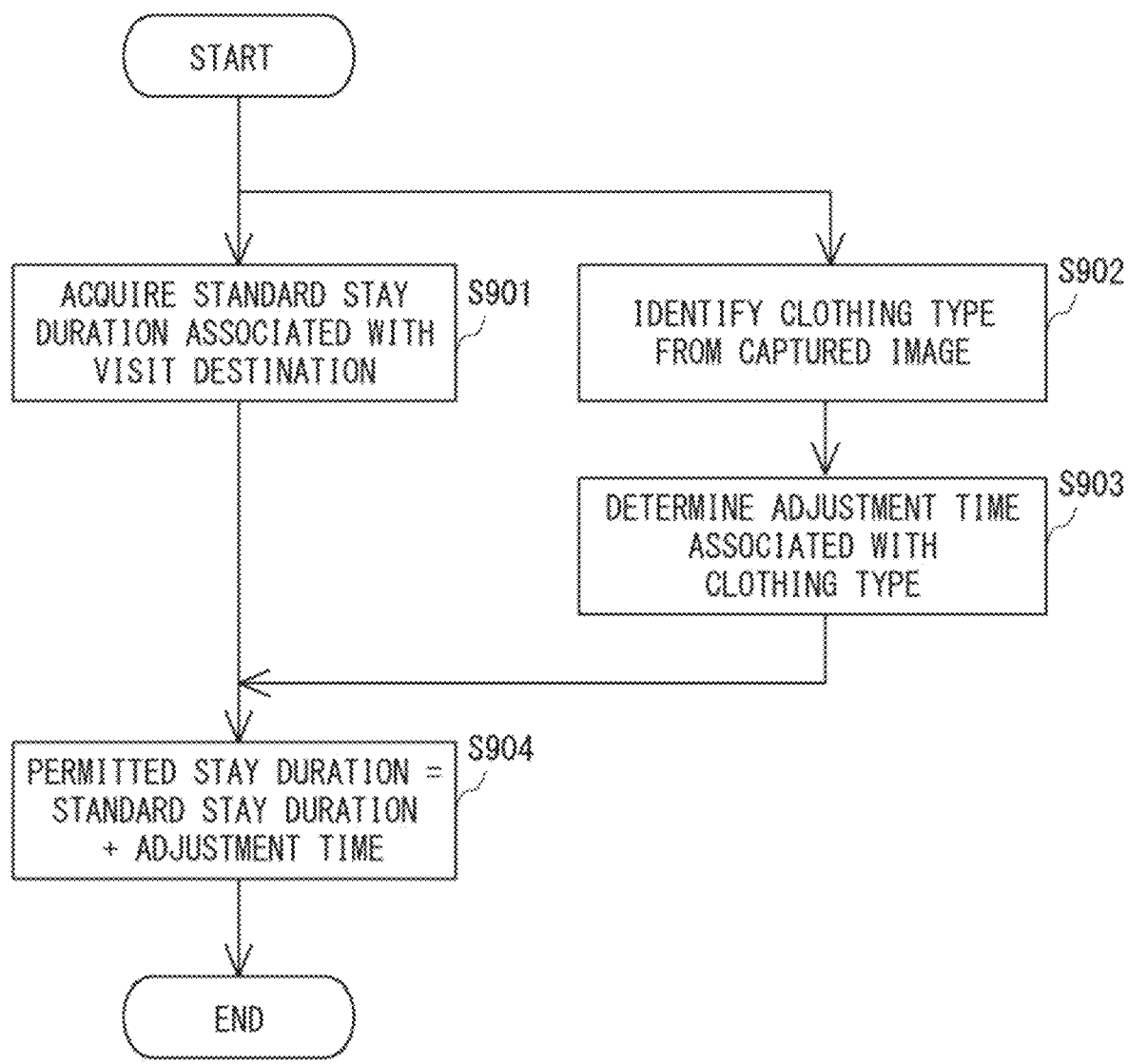
FIG. 19 is a flowchart describing a determination process of a permitted stay duration according to the fourth example embodiment.

FIG. 19 is a flowchart describing a determination process of the permitted stay duration according to the fourth example embodiment.

The determination unit 130*c* acquires the standard stay duration that is associated with the visit destination information (step S901). The standard stay duration is set to one hour. Next, the analysis unit 170*c* acquires a captured image from the entrance camera 410 or the surveillance camera 300, and identifies the clothing type (for example, a suit) of the visitor by image analysis (step S902). The adjustment unit 180*c* determines the adjustment time (for example, two hours) that is associated with the clothing type (for example, a suit) that is identified (step S903). Lastly, the permitted stay duration (three hours) is calculated based on the standard stay duration (one hour) and the adjustment time (two hours) (step S904). Additionally, the standard stay duration, the adjustment time, and the permitted stay duration may be set freely.

With the stay management system according to the fourth example embodiment described above, the permitted stay duration may be adjusted by performing image analysis on clothing of the visitor, and more flexible stay management may be performed.

In the examples described above, programs may be supplied to a computer by being stored using various types of non-transitory computer-readable media. The non-transitory computer-readable media include various types of tangible recording media (tangible storage media). Examples of the non-transitory computer-readable media include magnetic storage media, optical magnetic recording media (such as magneto-optical disks), CD-ROMs (read only memories), CD-Rs, CD-R/Ws, and semiconductor memories. The magnetic storage media may be flexible disks, magnetic tapes, and hard disk drives, for example. The semiconductor memories may be mask ROMs, PROMs (programmable ROMs), EPROMs (erasable PROMs), flash ROMs, and RAMs (random access memories), for example. Furthermore, the programs may be supplied to a computer by various types of transitory computer-readable media. Examples of the transitory computer-readable media include electric signals, optical signals, and electromagnetic waves. The transitory computer-readable media may supply the programs to a computer via wired communication lines such as an electric wire and an optical fiber, or a wireless communication line.

Additionally, the present disclosure is not limited to the example embodiments described above, and may be changed as appropriate within the scope of the present disclosure. Furthermore, the present disclosure may be implemented by combining the example embodiments as appropriate.

The example embodiments described above may, but not limited to, be partially or wholly described as in Supplementary notes given below.

(Supplementary Note 1)

A stay management apparatus comprising:
  registration means for acquiring a face image of a visitor, and for registering the face image in an authentication apparatus;
  entry control means for authenticating the visitor based on authentication target information that is associated with identification information of the visitor, and for permitting entry of the visitor into a building;
  acquisition means for acquiring visit destination information, about inside the building, which is associated with the identification information of the visitor;
  determination means for determining a permitted stay duration of the visitor inside the building based on the visit destination information that is acquired;
  detection means for detecting stay of the visitor by face authentication using the authentication apparatus, based on a monitor image that is captured by at least one surveillance camera inside the building; and
  output means for outputting an alert in a case where stay of the visitor is detected by the face authentication after a lapse of the permitted stay duration from permission of the entry.

(Supplementary Note 2)

The stay management apparatus according to Supplementary note 1, in which, in a case where face authentication, using the authentication apparatus, on a captured image of the visitor by a camera installed at an entrance of a predetermined building is successful, the entry control means permits entry of the visitor into the building.

(Supplementary Note 3)

The stay management apparatus according to Supplementary note 1 or 2, further comprising extension means for extending the permitted stay duration in a case where stay of the visitor at a predetermined location is detected by the detection means.

(Supplementary Note 4)

The stay management apparatus according to any one of Supplementary notes 1 to 3, in which the detection means causes the authentication apparatus to perform face authentication based on a monitor target list that is associated with the identification information of the visitor who is yet to leave the building and for whom the permitted stay duration is elapsed.

(Supplementary Note 5)

The stay management apparatus according to Supplementary note 2, further comprising registration means for registering the identification information of the visitor and the visit destination information in visit destination storage means in association with each other, in a case where the identification information of the visitor and specification of a visit destination are received,
  in which the acquisition means refers to the visit destination storage means, and acquires the visit destination that is associated with the visitor for whom the face authentication by the entry control means succeeded.

(Supplementary Note 6)

The stay management apparatus according to any one of Supplementary notes 1 to 5, in which, in a case where the visit destination information includes distance information or a required time between a current position of the visitor and a visit destination, the determination means determines the permitted stay duration to be longer as the distance or the required time is increased.

(Supplementary Note 7)

The stay management apparatus according to any one of Supplementary notes 1 to 6, in which, in a case where the visit destination information includes visit purpose information, the determination means determines a different permitted stay duration depending on the purpose.

(Supplementary Note 8)

The stay management apparatus according to Supplementary note 2, further comprising stay duration storage means for storing the visit destination information and standard stay duration in association with each other, and a clothing type and an adjustment time in association with each other,
  in which the determination means
    identifies the standard stay duration that is associated with the visit destination information that is acquired,
    analyzes the captured image, identifies the clothing type of the visitor, and identifies the adjustment time that is associated with the clothing type that is identified, and
    determines the permitted stay duration based on the standard stay duration and the adjustment time that are identified.

(Supplementary Note 9)

The stay management apparatus according to any one of Supplementary notes 1 to 6, in which the output means outputs the alert to a predetermined management terminal.

(Supplementary Note 10)

The stay management apparatus according to any one of Supplementary notes 1 to 9, in which, after a lapse of the permitted stay duration, the output means identifies a location where stay of the visitor is detected, and outputs the location that is identified, together with the alert.

(Supplementary Note 11)

A stay management method comprising:
  acquiring a face image of a visitor, and registering the face image in an authentication apparatus;
  authenticating the visitor based on authentication target information that is associated with identification information of the visitor, and permitting entry of the visitor into a building;
  acquiring visit destination information, about inside the building, which is associated with the identification information of the visitor;

determining a permitted stay duration of the visitor inside the building based on the visit destination information that is acquired;

detecting stay of the visitor by face authentication using the authentication apparatus, based on a monitor image that is captured by at least one surveillance camera inside the building; and outputting an alert in a case where stay of the visitor is detected by the face authentication after a lapse of the permitted stay duration from permission of the entry.

(Supplementary Note 12)

A non-transitory computer-readable medium storing a program for causing a computer to perform:

a process of acquiring a face image of a visitor, and of registering the face image in an authentication apparatus;

a process of authenticating the visitor based on authentication target information that is associated with identification information of the visitor, and of permitting entry of the visitor into a building;

a process of acquiring visit destination information, about inside the building, which is associated with the identification information of the visitor;

a process of determining a permitted stay duration of the visitor inside the building based on the visit destination information that is acquired;

a process of detecting stay of the visitor by face authentication using the authentication apparatus, based on a monitor image that is captured by at least one surveillance camera inside the building; and a process of outputting an alert in a case where stay of the visitor is detected by the face authentication after a lapse of the permitted stay duration from permission of the entry.

(Supplementary Note 13)

A stay management system comprising:

a gate apparatus configured to restrict entry/exit of a visitor;

a camera disposed inside a building;

the stay management apparatus according to any one of Supplementary notes 1 to 10;

an authentication apparatus including storage means for storing face feature information of a plurality of persons, and authentication means for performing face authentication using a collection of the face feature information; and a management terminal configured to receive output of the alert.

REFERENCE SIGNS LIST 10a-10c CONTROL UNIT
11a MEMORY
12a COMMUNICATION UNIT
13a, 13c STORAGE UNIT
100 STAY MANAGEMENT APPARATUS
100a-100c STAY MANAGEMENT APPARATUS
101 REGISTRATION UNIT
101a REGISTRATION UNIT
103a AUTHENTICATION CONTROL UNIT
110 ENTRY CONTROL UNIT
110a ENTRY CONTROL UNIT
120 ACQUISITION UNIT
120a ACQUISITION UNIT
130 DETERMINATION UNIT
130a DETERMINATION UNIT
140 DETECTION UNIT
140a DETECTION UNIT
150 OUTPUT UNIT
150a OUTPUT UNIT
160b EXTENSION UNIT
170c ANALYSIS UNIT
180c ADJUSTMENT UNIT
200 AUTHENTICATION APPARATUS
300 SURVEILLANCE CAMERA
400 GATE APPARATUS
410 ENTRANCE CAMERA
420 STORAGE UNIT
430 COMMUNICATION UNIT
440 DISPLAY UNIT
450 CONTROL UNIT
451 IMAGE CAPTURING CONTROL UNIT
452 GATE CONTROL UNIT
460 GATE
500 NETWORK
600 MANAGEMENT TERMINAL

The invention claimed is:

1. A stay management apparatus comprising:
at least one memory storing instructions, and
at least one processor configured to execute the instructions to:
perform authentication based on a face image of a visitor captured at an entrance of a predetermined region and a face image of the visitor registered in advance to permit entry of the visitor into the predetermined region;
determine a permitted stay duration of the visitor inside the predetermined region based on visit destination information indicating a location inside the predetermined region associated with the visitor registered in advance;
detect the visitor by face authentication using an image of the visitor captured inside the predetermined region; and
output an alert when the visitor is detected by the face authentication after a lapse of the permitted stay duration from permission of the entry.

2. The stay management apparatus according to claim 1, wherein the at least one processor is configured to execute the instructions to:
output the alert including a visitor ID that is identified and location information of a camera that captured the image of the visitor among a plurality of cameras when the visitor is detected by the face authentication after a lapse of the permitted stay duration from permission of the entry.

3. The stay management apparatus according to claim 2, wherein the at least one processor is configured to execute the instructions to extend the permitted stay duration when stay of the visitor at a predetermined location is detected.

4. The stay management apparatus according to claim 2, wherein the at least one processor is configured to execute the instructions to cause an authentication apparatus to perform face authentication based on a monitor target list that is associated with identification information of a visitor who is yet to leave the predetermined region and for whom the permitted stay duration is elapsed.

5. The stay management apparatus according to claim 2, wherein the at least one processor is configured to execute the instructions to:
acquire visit destination information inside the predetermined region associated with identification information of the visitor; and register the identification information of the visitor and the visit destination information in visit destination storage in association with each other, in a case where the identification information of the visitor and specification of a visit destination are received, wherein the at least one processor is configured to execute the instructions to refer to the visit destination storage and acquire the visit destination that is associated with the visitor for whom the face authentication is succeeded and permitted for entry.

6. The stay management apparatus according to claim 1, wherein the at least one processor is configured to execute the instructions to permit entry of the visitor into the predetermined region when face authentication on a captured image of the visitor by a camera installed at an entrance of the predetermined region is successful.

7. The stay management apparatus according to claim 1, wherein the at least one processor is configured to execute the instructions to determine, in a case where the visit destination information includes distance information between a current position of the visitor and a visit destination, the permitted stay duration to be longer as the distance is increased.

8. The stay management apparatus according to claim 1, wherein the at least one processor is configured to execute the instructions to determine, in a case where the visit destination information includes visit purpose information, a different permitted stay duration depending on the purpose of the visit.

9. A stay management method performed by a computer, comprising:

performing authentication based on a face image of a visitor captured at an entrance of a predetermined region and a face image of the visitor registered in advance to permit entry of the visitor into the predetermined region;

determining a permitted stay duration of the visitor inside the predetermined region based on visit destination information indicating a location inside the predetermined region associated with the visitor registered in advance;

detect the visitor by face authentication using an image of the visitor captured inside the predetermined region; and output an alert when the visitor is detected by the face authentication after a lapse of the permitted stay duration from permission of the entry.

10. A non-transitory computer-readable medium storing a program for causing a computer to perform:

processing for performing authentication based on a face image of a visitor captured at an entrance of a predetermined region and a face image of the visitor registered in advance to permit entry of the visitor into the predetermined region;

processing for determining a permitted stay duration of the visitor inside the predetermined region based on visit destination information indicating a location inside the predetermined region associated with the visitor registered in advance;

detect the visitor by face authentication using an image of the visitor captured inside the predetermined region; and output an alert when the visitor is detected by the face authentication after a lapse of the permitted stay duration from permission of the entry.

* * * * *